(12) United States Patent
Baker et al.

(10) Patent No.: US 8,577,279 B2
(45) Date of Patent: Nov. 5, 2013

(54) VISUAL SCENE DISPLAYS, USES THEREOF, AND CORRESPONDING APPARATUSES

(75) Inventors: Bruce R. Baker, Pittsburgh, PA (US); Katya Hill, Pittsburgh, PA (US); Russell T. Cross, Wooster, OH (US); Gail M. Van Tatenhove, Orlando, FL (US); Bruce Helmbold, Edmonton (CA); Jutta Herrmann, Pittsburgh, PA (US); Robert V. Conti, Bethel Park, PA (US); Robert T. Stump, Duquesne, PA (US); Mark A. Zucco, Pittsburgh, PA (US)

(73) Assignee: Semantic Compaction Systems, Inc., Pittsburgh, PA (US)

( * ) Notice: Subject to any disclaimer, the term of this patent is extended or adjusted under 35 U.S.C. 154(b) by 887 days.

(21) Appl. No.: 12/076,046

(22) Filed: Mar. 13, 2008

(65) Prior Publication Data

US 2008/0233546 A1 Sep. 25, 2008

Related U.S. Application Data

(60) Provisional application No. 60/907,076, filed on Mar. 19, 2007.

(51) Int. Cl.
G09B 3/00 (2006.01)
(52) U.S. Cl.
USPC .......................... 434/350; 434/322; 434/323
(58) Field of Classification Search
USPC ................. 434/112, 116, 156, 185; 704/271; 116/17
See application file for complete search history.

(56) References Cited

U.S. PATENT DOCUMENTS

| | | | | | |
|---|---|---|---|---|---|
| 520,399 | A | * | 5/1894 | Purdy | 283/42 |
| 4,165,890 | A | * | 8/1979 | Leff | 283/46 |
| 4,333,092 | A | * | 6/1982 | Field | 340/815.53 |
| 4,661,916 | A | * | 4/1987 | Baker et al. | 704/260 |
| 4,795,348 | A | * | 1/1989 | Garthwaite | 434/112 |
| 5,169,342 | A | * | 12/1992 | Steele et al. | 434/112 |
| 5,297,041 | A | * | 3/1994 | Kushler et al. | 715/202 |
| 5,299,125 | A | * | 3/1994 | Baker et al. | 704/9 |
| 5,309,546 | A | * | 5/1994 | Baker et al. | 704/271 |
| 5,742,779 | A | * | 4/1998 | Steele et al. | 715/839 |
| 5,748,177 | A | * | 5/1998 | Baker et al. | 345/172 |

(Continued)

OTHER PUBLICATIONS

K.D.R. Drager et al. (2003), "The performance of typically developing 2½-year-olds on dynamic display AAC technologies with different system layouts and language organization." *Journal of Speech and Hearing Research*, 46, p. 298-312.

(Continued)

*Primary Examiner* — Robert J Utama
(74) *Attorney, Agent, or Firm* — Harness, Dickey & Pierce, P.L.C.

(57) ABSTRACT

A method and a device are provided. In at least one embodiment, the method includes receiving an indication of selection of a key from a keyboard, including at least one of a polysemous symbol and a compilation symbol; and displaying a scene related to the selected at least one of a polysemous symbol and a compilation symbol. In at least one embodiment, the device includes a keyboard including a plurality of keys including polysemous symbols; and a display to display, on at least a portion thereof and in response to receiving an indication of selection of a key including at least one of a polysemous symbol and a compilation symbol, a scene related to the selected at least one of a polysemous symbol and a compilation symbol.

101 Claims, 17 Drawing Sheets

(56) References Cited

U.S. PATENT DOCUMENTS

| | | | |
|---|---|---|---|
| 5,920,303 A * | 7/1999 | Baker et al. | 345/172 |
| 5,973,694 A * | 10/1999 | Steele et al. | 715/835 |
| 6,056,549 A * | 5/2000 | Fletcher | 434/112 |
| 6,357,940 B1 * | 3/2002 | Murphy | 400/483 |
| 7,107,547 B2 * | 9/2006 | Cule et al. | 715/810 |
| 7,506,256 B2 * | 3/2009 | Baker et al. | 715/708 |
| 2003/0099459 A1 | 5/2003 | Yanagita et al. | |
| 2007/0005795 A1 * | 1/2007 | Gonzalez | 709/232 |

OTHER PUBLICATIONS

J. Reichle et al. (2000), Comparison of correct responses and response latency for fixed and dynamic displays: Performance of a learner with severe developmental disabilities. AAC: *Augmentative and Alternative Communication*, 16, p. 154-163.

Minhua Eunice MA. "Confucius: An Intelligent MultiMedia storytelling interpretation and presentation system." PhD Thesis, University of Ulster, Magee. Sep. 29, 2002.

PCT/ISA/210 dated Aug. 11, 2008.

* cited by examiner

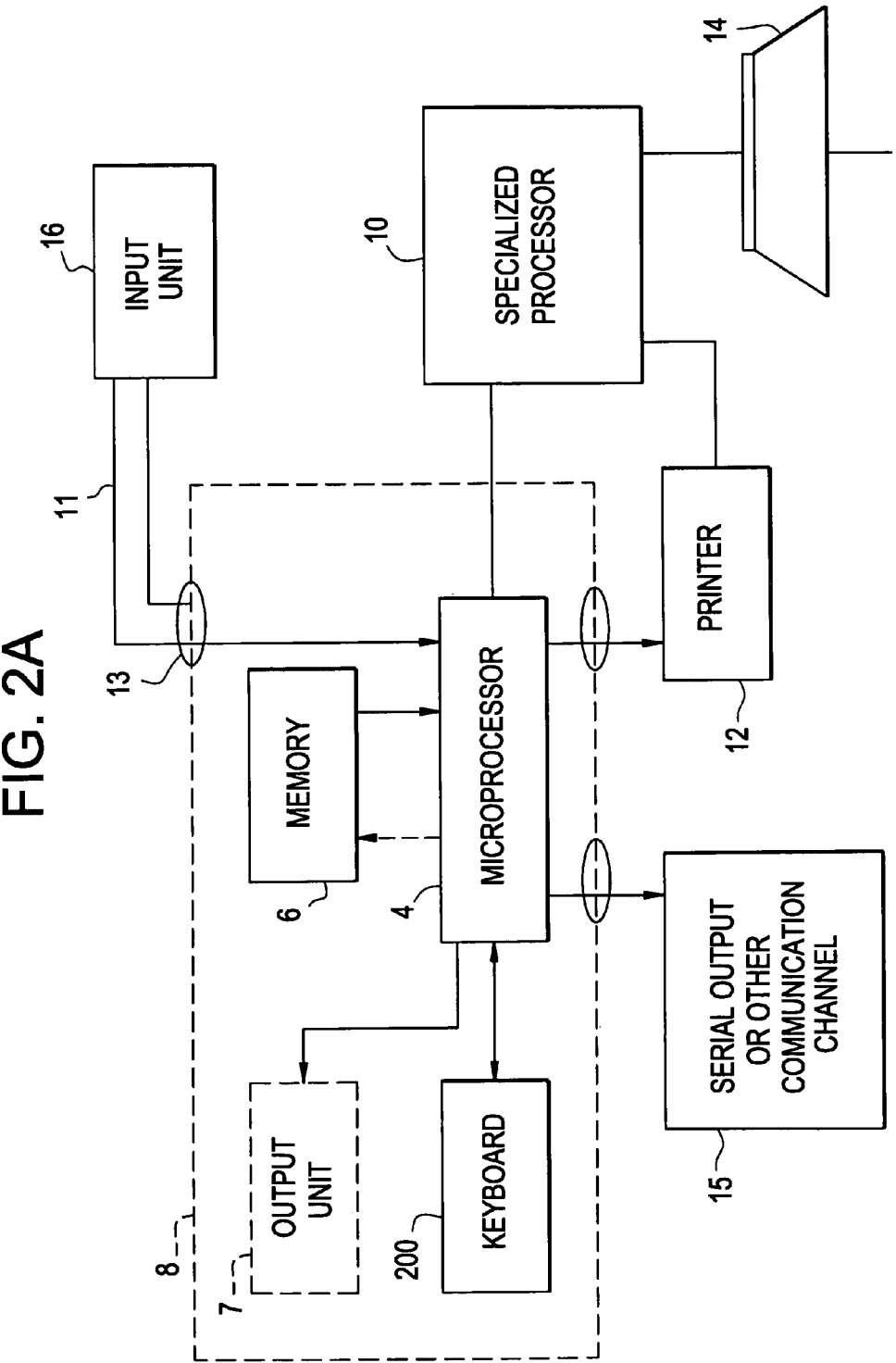

corn spinach cauliflower

| Word/Phrase | Unity/Min. Symbol Sequence | Pixon |
|---|---|---|
| all done | family + stop sign | all done  |
| good night | interj + bed | good night  |
| but | conj + bed | but  |
| away | add verb + map | away  |
| busy | bee + Adj | busy  |
| call | phone + phone + verb | call  |
| cold | mountain + Verb | cold  |
| fun | sun + noun | fun  |

VISUAL SCENE DISPLAYS, USES THEREOF, AND CORRESPONDING APPARATUSES

PRIORITY STATEMENT

The present application hereby claims priority under 35 U.S.C. §119(e) on U.S. patent application No. 60/907,076 filed Mar. 19, 2007, the entire contents of which is hereby incorporated herein by reference.

FIELD

Embodiments of the present invention generally relate to methods and/or devices utilizing Visual scene displays (VSDs) including a photograph or pictorial scene in which vocabulary is embedded.

BACKGROUND

In 1996, Assistive Technology Inc. of Dedham, Mass. introduced the Companion software (CSUN Conference). Companion was based on animated pictorial scenes, with the idea that finding single meaning vocabulary in a contextual presentation would be successful in teaching the cognitively impaired. Four publications discussing the use of VSDs in such a context include:

Light, Drager, Speltz, Fallon & Jeffries. The Performance of Typically Developing 2½ Year-Olds on Dynamic Display AAC Technologies With Different System Layouts and Language Organizations (VSD vs. Grid, all page-based), Journal of Speech, Language and Hearing, Volume 46, April 2003, pp. 298-312;

Light, Drager, McCarthy, Mellot, Millar, Parrish, Parsons, Rhoads, Ward, Welliver. Performance of Typically Developing Four- and Five-Year-Old Children with AAC Systems using Different Language Organization Techniques (VSD, Page-based & Minspeak) AAC, Volume 20, June 2004, pp. 63-88;

Drager, Light, Carlson, D'Silva, Larsson, Pitkin, Stopper. Learning of Dynamic Display AAC Technologies by Typically Developing 3-Year-Olds: Effect of Different Layouts and Menu Approaches (VSD vs. Grid, all page-based), Journal of Speech, Language, and Hearing Research, Volume 47, October 2004, pp. 1133-1148; and Light, Drager. AAC to Improve Language, Literacy, and Communication Outcomes for Young Children with Complex Communication Needs, AAC-RERC State-of-the-Art Whitepaper 2006.

In one example, a VSD master page such as that of FIG. 1A for example, included a house with four rooms 1a-1d (each a miniature version of the target scene). A VSD page could then be accessed from the master page of FIG. 1A for example, as shown by the selection square 2 encompassing and selecting room 1d. Then, the display of FIG. 1A would be replaced by an enlarged version of the selected room as shown in FIG. 1B for example. The selected room of FIG. 1B would then include vocabulary 'hot spots' (portions of the picture that could be selected by being touched or activated to provide at least one of an audible and visual response including the present 3a, the boy 3b, the cat 3c, etc.).

The data showed that children generally could not find the correct page in grid-based page systems:
Chance of randomly selecting correct page was ¼; and Children's average accuracy in selecting correct grid page: ~¼.

Children had difficulty either identifying the correct page or identifying the link from the menu page to the target page. Children did slightly better in the overall task with the VSD-based system, but still found less than ¼ of the words. In the VSD condition, children scored an average of 2.6 of 12 correct responses across 4 sessions. In the taxonomic grid condition, children scored about 1 of 12. In the activity-based condition, children scored about 1.4 of 12.

All conditions in both studies were page-based single meaning pictures. Further, the results of the articles indicated that 2½ and 3-year-old children performed poorly on both traditional page-based systems and VSD page-based systems. The studies were not well-designed to address language acquisition models, but focused on conscious learning of the location of words already known to typically developing children.

Traditional page-based systems included pages of grids grid representations with small individual pictures representing vocabulary. Grid representations were a collection of individual symbols/pictures that represent vocabulary items and were used to teach, at best, individual vocabulary words.

None of the page-based arrangements (grid or VSD) was initially transparent to the children in these studies. The children performed poorly in all page-based single meaning picture conditions but were able to locate slightly more vocabulary items in the VSD condition than in the grid-based approaches. Although the VSDs were initially used, the studies found that the children had to move away from the VSDs as soon as possible, to a standard grid type single meaning display.

Thus, VSDs are currently not being proposed for independent generative communication on the device. If person using a communication aid is trying to find vocabulary to communicate meaning, which VSD page is he or she going to look for? How can that person find that page? VSD usage is heavily dependent on a therapist or communication partner. The therapy structures proposed by Light are both clinician-intensive and clinician-driven. The cost of learning in transitions to/from VSDs to any other format on the device is very high. Clinicians are unclear as to how to bridge the gap from VSDs to spontaneous language generation and independent communication. Generating language on the device to model language acquisition as discussed by R. Brown, R. Paul, L. Bloom does not seem to be the goal of VSDs.

SUMMARY

The inventors of the present application recognized that the structure of the research of Light and others was based on multiple pages and single meaning icons. Further, they recognized that Light criticized grid-based systems, but her research team nevertheless quickly transitioned kids from VSDs to grid systems, each of which taught only individual words, not language syntagmas. They recognized that Light's data did not show much real difference between the syntagmas generated using the VSD and the syntagmas of words generated on other page-based systems. Further, they realized that such page based grids and VSDs taught only individual words, not how to organize syntagmas for communication purposes.

In at least one embodiment of the present invention, a method and/or device is provided which combines polysemous symbol use and VSDs to generate spoken or written language, to thereby enable learning a system that easily transitions to easy communication. In at least one embodiment of the present invention, a method and/or device maintains the use of VSDs to help acquire language skills in many ways. In at least one embodiment of the present invention, a method and/or device is provided which provides a format to teach a symboled system to represent language in a method using sequenced polysemous icons of fixed positions consistent with promoting motor planning. In at least one embodiment of the present invention, a method and/or device is provided which provides, as a final goal, to teach vocabulary and language in a way that encourages consistent motor planning for the final representation by combining VSDs and polysemous symbol sequences.

In at least one embodiment of the present invention, a method is provided including receiving an indication of selection of a key from a keyboard, including at least one of a polysemous symbol and a compilation symbol; and displaying a scene related to the selected at least one of a polysemous symbol and a compilation symbol.

In at least one embodiment of the present invention, a method is provided including receiving an indication of selection of a key from a keyboard, including a polysemous symbol; and displaying a scene relating at least one of an accessible word, phrase or message to the polysemous symbol of the selected key.

In at least one embodiment of the present invention, a method is provided including receiving an indication of selection of a key from a keyboard, including a polysemous symbol; and displaying a scene, on at least a portion of a display, relating the polysemous symbol of the selected key to a category of selectable symbol sequences including the polysemous symbol of the selected key as a first symbol.

In at least one embodiment of the present invention, a device is provided including a keyboard including a plurality of keys including at least one of at least one polysemous symbol and at least one compilation symbol; and a display to display, on at least a portion thereof and in response to selection of a key including at least one of a polysemous symbol and a compilation symbol, a scene related to the selected at least one of a polysemous symbol and a compilation symbol.

In at least one embodiment of the present invention, a device is provided including a keyboard including a plurality of keys including polysemous symbols; and a display to display, on at least a portion thereof and in response to selection of a key including a polysemous symbol, a scene relating the selected polysemous symbol to at least one of a word, phrase, and message, accessible via a selectable symbol sequence including the selected polysemous symbol.

In at least one embodiment of the present invention, a method is provided including receiving an indication of selection of a key from a keyboard, including a compilation symbol relating to plurality of symbols in a sequence of symbols usable to access at least one of a word, phrase and message; and displaying a scene, including the compilation symbol, relating the selected compilation symbol to the accessible at least one of a word, phrase, and message.

In at least one embodiment of the present invention, a method is provided including receiving an indication of selection of a key from a keyboard, including a compilation of a plurality of symbols which, when sequenced together, are usable to access at least one of a word, phrase and message; and displaying a scene, including the selected key, relating the selected compilation of a plurality of symbols to the accessible at least one of a word, phrase, and message.

In at least one embodiment of the present invention, a device is provided including a keyboard including a plurality of keys, at least one key including a compilation symbol relating to plurality of symbols in a sequence of symbols usable to access at least one of a word, phrase and message; and a display to display, on at least a portion thereof and in response to selection of a key including a compilation symbol, a scene relating the selected compilation symbol to the accessible at least one of a word, phrase, and message.

In at least one embodiment of the present invention, a device is provided including a keyboard including a plurality of keys, at least one key including a compilation of a plurality of symbols which, when sequenced together, are usable to access at least one of a word, phrase and message; and a display to display, on at least a portion thereof and in response to selection of a key including a compilation of a plurality of symbols, a scene relating the selected key including the compilation of a plurality of symbols to the accessible at least one of a word, phrase, and message.

In at least one embodiment of the present invention, a method is provided including receiving an indication of selection of a compilation symbol relating to plurality of symbols in a sequence of symbols, usable to access at least one of a word, phrase and message; and using the selected compilation symbol to teach someone the symbol sequence, usable to access at least one of a word, phrase, and message.

In at least one embodiment of the present invention, a method is provided including receiving an indication of selection of a compilation symbol, including a plurality of symbols which, when sequenced together, are usable to access at least one of a word, phrase and message; and using the selected compilation symbol, including the plurality of symbols, to teach someone the symbol sequence, usable to access at least one of a word, phrase, and message.

In at least one embodiment of the present invention, a method is provided including displaying a scene relating a selected polysemous symbol to at least one of a word, phrase, and message, accessible via a selectable symbol sequence including the selected polysemous symbol; and monitoring usage of polysemous symbols and the displayed scene.

In at least one embodiment of the present invention, a method is provided including displaying a scene, including a compilation symbol related to plurality of symbols in a sequence of symbols usable to access at least one of a word, phrase and message, the displayed scene relating a selected compilation symbol to the accessible at least one of a word, phrase, and message; and monitoring usage of at least two of compilation symbols, polysemous symbols and displayed scenes.

In at least one embodiment of the present invention, a device is provided including a display to display a scene relating a selected polysemous symbol to at least one of a word, phrase, and message, accessible via a selectable symbol sequence including the selected polysemous symbol; and a processor to monitor usage of polysemous symbols and the displayed scene.

In at least one embodiment of the present invention, a device is provided including a display to display a scene, including a compilation symbol related to plurality of symbols in a sequence of symbols usable to access at least one of a word, phrase and message, the displayed scene relating a selected compilation symbol to the accessible at least one of a word, phrase, and message; and a processor to monitor usage of at least two of compilation symbols, polysemous symbols and displayed scenes.

In at least one embodiment of the present invention, a method is provided including using pictorial context of a display to teach de-contextualized sequencing of polysemous symbols of a keyboard.

BRIEF DESCRIPTION OF THE DRAWINGS

Further advantages, features and properties of the present invention are explained below in more detail with the aid of exemplary example embodiments and with reference to the accompanying drawings, in which:

FIGS. 2A and 2B generally illustrate structure of an apparatus of at least one embodiment of the present application;

DETAILED DESCRIPTION OF THE EXAMPLE EMBODIMENTS

Figure 1A:
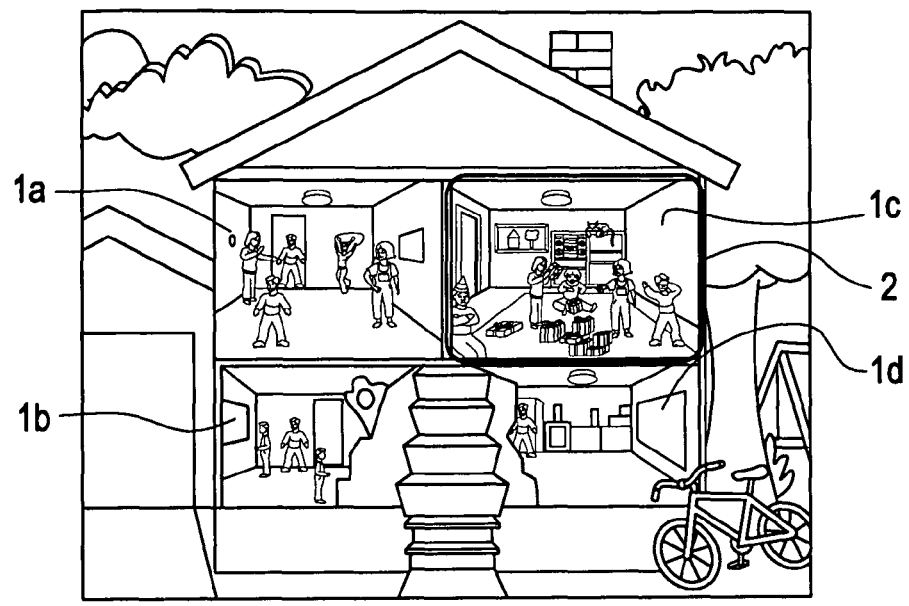
FIG. 1A illustrates a known VSD master page including four selectable rooms.
Figure 1B:
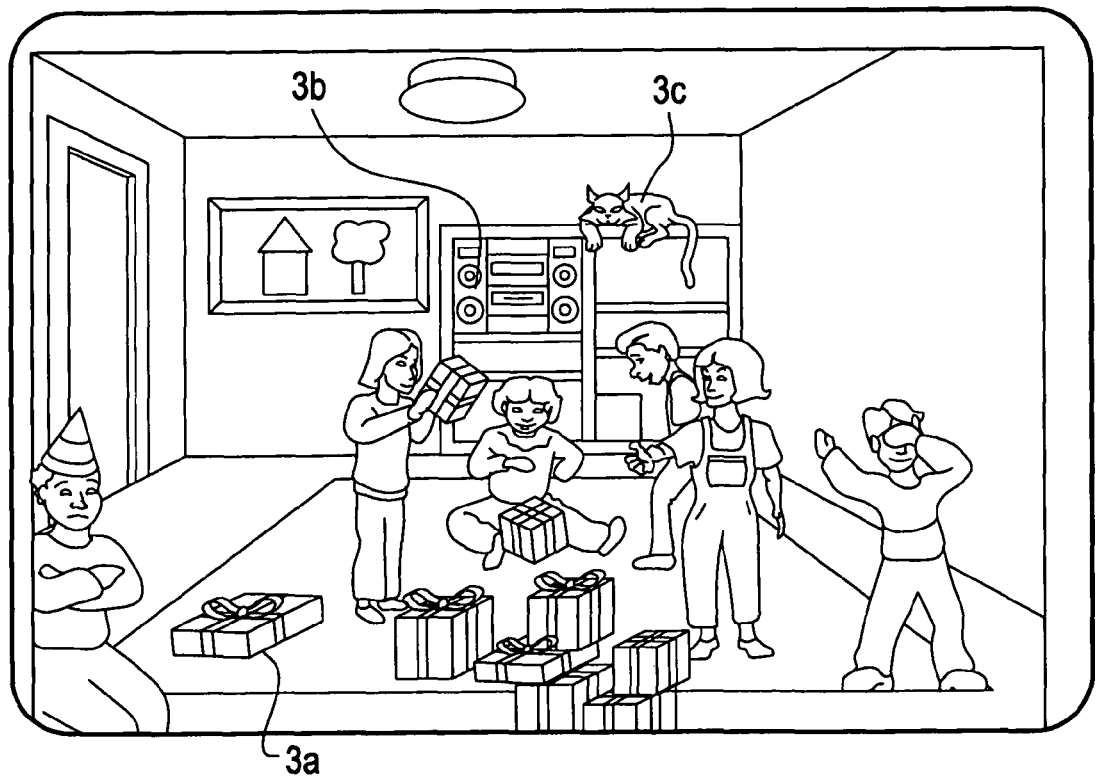
FIG. 1B illustrates a selected room of the display of FIG. 1A including 'hot spots'.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between" versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Further, as used herein, the terms symbol and icon are used interchangeably and have the same meaning.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

One aspect of an embodiment of this application involves how to use such VSD's to teach a specific language content. The specific language content may include, for example, a language application program involving sequenced polysemous symbols or icons used to access stored words, themes or phrases, such as those discussed in any of U.S. Pat. No. 4,661,916 entitled "System and method for producing syntactic plural word messages" (the Baker '916 patent) issued Apr. 28, 1987 to Baker et. al; U.S. Pat. No. 5,097,425 entitled "Predictive Scanning Input System For Rapid Selection of Visual Indicators" (the Baker '425 patent) issued Mar. 17, 1992 to Baker et. al; U.S. Pat. No. 5,297,041 entitled "Predictive Scanning Input System For Rapid Selection of Auditory and Visual Indicators" (the Baker '041 patent) issued Mar. 22, 1994 to Baker et. al; and U.S. Pat. No. 5,920,303 entitled "Dynamic keyboard and method for dynamically redefining keys on a keyboard" to Baker et al, patented Jul. 6, 1999 (the Baker '303 patent), the entire contents of each of which is hereby incorporated herein by reference.

The inventors discovered, in at least one embodiment, applications for VSDs as teaching tools, rather than communication systems. VSDs to can be used to teach language. Engaging very young children in language-acquisition-centered games can be fun and clinically powerful. It is the role of PRC and SCS to add clinical value to the VSD approach without sacrificing principles of sequencing multi-meaning (polysemous) icons.

In at least one embodiment, a set of icons and Pixons (to be described hereafter) relate to each other through rationales or stories. A word, phrase or message is represented and accessible by a sequence of selected icons, many times involving one or more polysemous symbols. A keyboard 200 may include various fixed icon arrays in 128, 85, 60, 45, and 16 permanent locations for example, and floating activity rows (for example, including those discussed in the Baker '303 patent), however it is not limited as such.

Figure 2B:
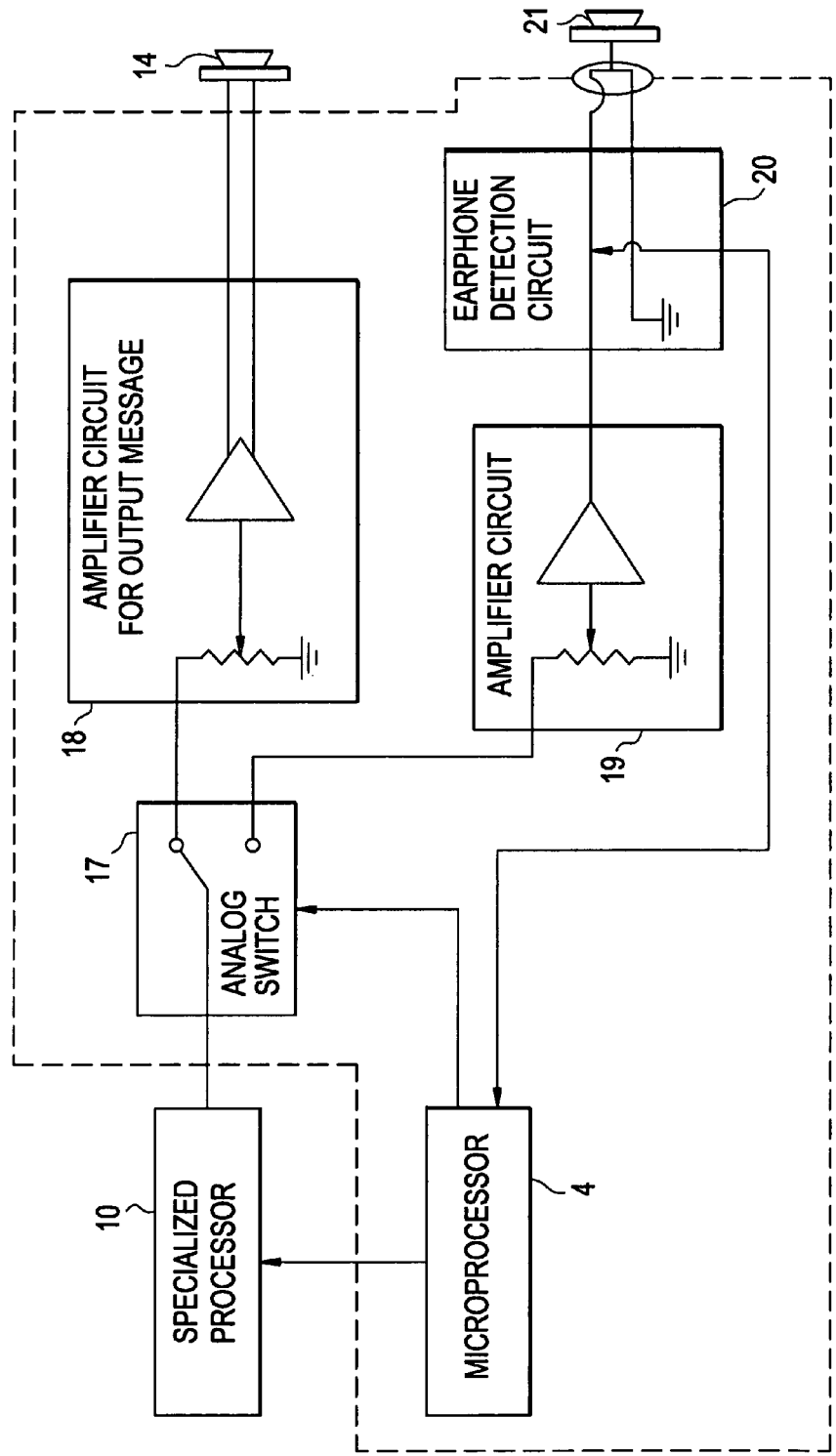

Referring to FIGS. 2A and 2B, there is illustrated an apparatus of an embodiment of the present application, generally designated by 8. The apparatus 8 is shown in FIG. 2A in conjunction with a specialized processor 10 and output unit 7, printer 12, communication channel 15, audio circuits 18 and 19 with speakers 14 and 21. Alternatively, circuit 19 and speaker 21 may be omitted, with audio output routed through circuit 18 to speaker 14 for example. The apparatus 8 may generate input for the processor 10 based on accessing information (e.g. a word, phrase or message) corresponding to polysemous symbol sequences associated with keys on the keyboard 200, for output to the output unit 7 (for display in a word processing mode for example, wherein the apparatus of at least one embodiment of the present application may include a display to display the output at least one word, phrase or message associated with the sequence of selected symbols) and/or to speaker 14 (in a speech processing mode for example). The apparatus 8 may generate input for the processor 10 based on accessing information corresponding to polysemous symbols of selected keys of the keyboard 200. Alternatively, the specialized processor 10 may be omitted, and the apparatus 8 may output processed information to printer 12, output unit 7, communication channel 15, etc. Any and all of the output channels of apparatus 8 may be selected to output a given at least one word, phrase or message.

It should be noted that if the output unit 7 includes a display, the keyboard 200 and the display may be integrated. Further, the keyboard 200 may be a virtual keyboard, and again may be integrated with a display.

The addition of auditory scanning capabilities to the apparatus 8, in at least one embodiment, may include that the specialized processor 10 includes a microprocessor controlled speech synthesizer, to synthesize speech for example. The synthesizer should be a high quality synthesizer that is easily understood by the user. Anything less will make the system difficult to learn and use in other than optimal conditions. To maximize the effectiveness of the system, provisions need to be made in the hardware to allow the microprocessor 4 to route the audio signal output from the specialized processor 10 either to the user or the conversation partner. If both the system prompts and user generated speech are sent to the external speaker 14, the conversation partner will have system prompts intended for the user's access requirements.

Thus, in at least one embodiment, a speech synthesis system may include the apparatus 8, as well as a speech synthesizer to synthesize the output at least one word, phrase or message.

The example implementation of auditory scanning is shown and described regarding FIG. 2B and uses an analog switch 17 to route the output from the speech synthesizer to either the standard audio output circuit 18 to speak to a listener through speaker 14, or to route the audio to the prompt audio output circuit 19 to inform the user of the present state of the apparatus through an earphone or private speaker 21. An earphone detection circuit 20 may also be included in this example. The apparatus 8 can detect if the earphone becomes disconnected and route the auditory scanning prompts to the main speaker if needed to keep the system functional.

As stated above, the apparatus 8 may include an output unit 7. This output unit 7 can be one of a processor and speaker to generate audible sound waves, light source matrix with individually controlled lights, or any similar type output device or combination of devices which can be utilized in conjunction with one of a plurality of different input units 16. The input unit 16 may be one or more of a plurality of input devices (such as those described in U.S. Pat. No. 5,297,041 issued Mar. 22, 1994 to Kushler et. al., the entire contents of which are hereby incorporated herein by reference) which is utilized in conjunction with the output device 7 and the microprocessor 4 to activate signals corresponding to the plurality of keys on the keyboard and thus indicate selection of a particular key. Further, this input device 16 can be connected to the microprocessor 4 through a cable 11 which is attached to an input port 13 of the apparatus 8. Thus, a plurality of various input units 16 may be utilized to effect key selection and activation without depressing a key on the keyboard.

The processor 10 may be a language translator, a voice synthesizer and/or any other similar-type processor which may process at least one word, phrase or message accessed by the apparatus 8. Upon processing of the accessed at least one word, phrase or message, the at least one word, phrase or message may then be output to an analog switch 17 under the control of microprocessor 4. This circuit can send the audio output signal of processor 10 to amplifier circuit 18 and then to speaker 14, as shown in FIG. 2B, to output an audible message corresponding to the accessed at least one word, phrase or message to communicate the accessed at least one word, phrase or message to another person. The specialized processor 10, may be one of a commercially available speech synthesizer such as the Votrax speech SPAC with the SC-01 voice synthesizer chip therein, marketed by Votrax or the commercially available DecTalk or SmoothTalker, for example.

The output of the synthesizer, or a similar specialized processor, may be in turn coupled to a speaker 14 as described above to generate audible synthetic speech in a manner well known in the art. Microprocessor 4 may also use the analog switch 17 to route the audio output signal from microprocessor 10 to amplifier circuit 19 and then to a private listening speaker or earphone 21 used by the operator of apparatus 8 to receive auditory feedback from the system (during auditory scanning, for example). If the earphone detection circuit 20 indicates that no external earphone or speaker is connected, or alternatively, if the entire audio circuit system of 19, 20 and 21 is omitted, this auditory feedback signal can be routed to amplifier 18 and speaker 14. As such, in at least one embodiment of the present application, a speech synthesis system is disclosed, including the apparatus 8 and a speech synthesizer to synthesize the output at least one word, phrase or message.

In addition, a scanning system as disclosed in U.S. Pat. No. 5,297,041 issued Mar. 22, 1994 to Kushler et. al., the entire contents of which are hereby incorporated herein by reference, may include the apparatus 8 described above. A row-column scanner, as disclosed in U.S. Pat. No. 5,297,041 issued Mar. 22, 1994 to Kushler et. al., may be used to detect selection of a key of the keyboard 200 of FIG. 2A. Thus, in at least one embodiment, a scanning system can include the apparatus 8 and a row-column scanner to select a key.

Further, an apparatus 8 (of FIG. 2A for example) of an embodiment of the present application can further include a processor (such as a microprocessor 4 of FIGS. 2A and 2B for example), to determine whether or not a plurality of symbols, associated with a plurality of selected keys, form a sequence of symbols associated with at least one word, phrase or message, and, in response to determining that the plurality of selected symbols form a sequence of symbols associated with at least one word, phrase or message, to instruct output (via output unit 7 of FIG. 2A for example) of the at least one word, phrase or message.

The apparatus 8 can also include a memory 6, to store the plurality of symbol sequences, each in association with at least one word, phrase or message. The memory 6 may be used to store the plurality of symbol sequences (in a database for example), each stored in association with at least one word, phrase or message. In addition, the apparatus 8 may include a display as the output unit 7 for example, to display the output at least one word, phrase or message associated with the sequence of selected symbols. Each stored symbol sequence may include two or three symbols, for example, each sequence associated with at least one word, phrase or message. Further, the keyboard 200 may be a virtual keyboard; and the keyboard 200 and display may be integrated.

One aspect of an embodiment of the present application uses visual scene displays (VSDs) to teach a potential user of the system (who many times is cognitively impaired in some way, for example) the polysemous symbols or icons and Pixons in terms of icon or symbol sequences that they are used in, how they relate differentially to each other, why and how they link together, etc. Further, the Pixons can also be used, in at least one embodiment, to teach a potential user symbol sequences corresponding thereto. The teaching tasks may include, but are not limited to:

The primary meaning and label of the polysemous icon/symbol or composite symbol used to introduce a later polysemous use of the symbol or elements of the symbol
The position of the icon in relationship to other icons
The attributes and categories suggested by the icon
The vocabulary represented by the icons
The grammatical relationships between and among icons
The semantic, ontological, taxonomic networks of the icons and their arrays
The rules underlying Unity®'s infrastructure
The color patterns of the icons
The relationship of semantic icons to grammatical icons
The phrase structures using pronouns and verbs
The structures and access of phrasal verbs
The use of icon prediction in Unity®
The use of activity rows in Unity®
The use of pop-ups for literate facilitators in teaching Unity®
Access strategies for obtaining variations for different parts of speech—tense, comparisons, plurality, case, etc.

Figure 3:
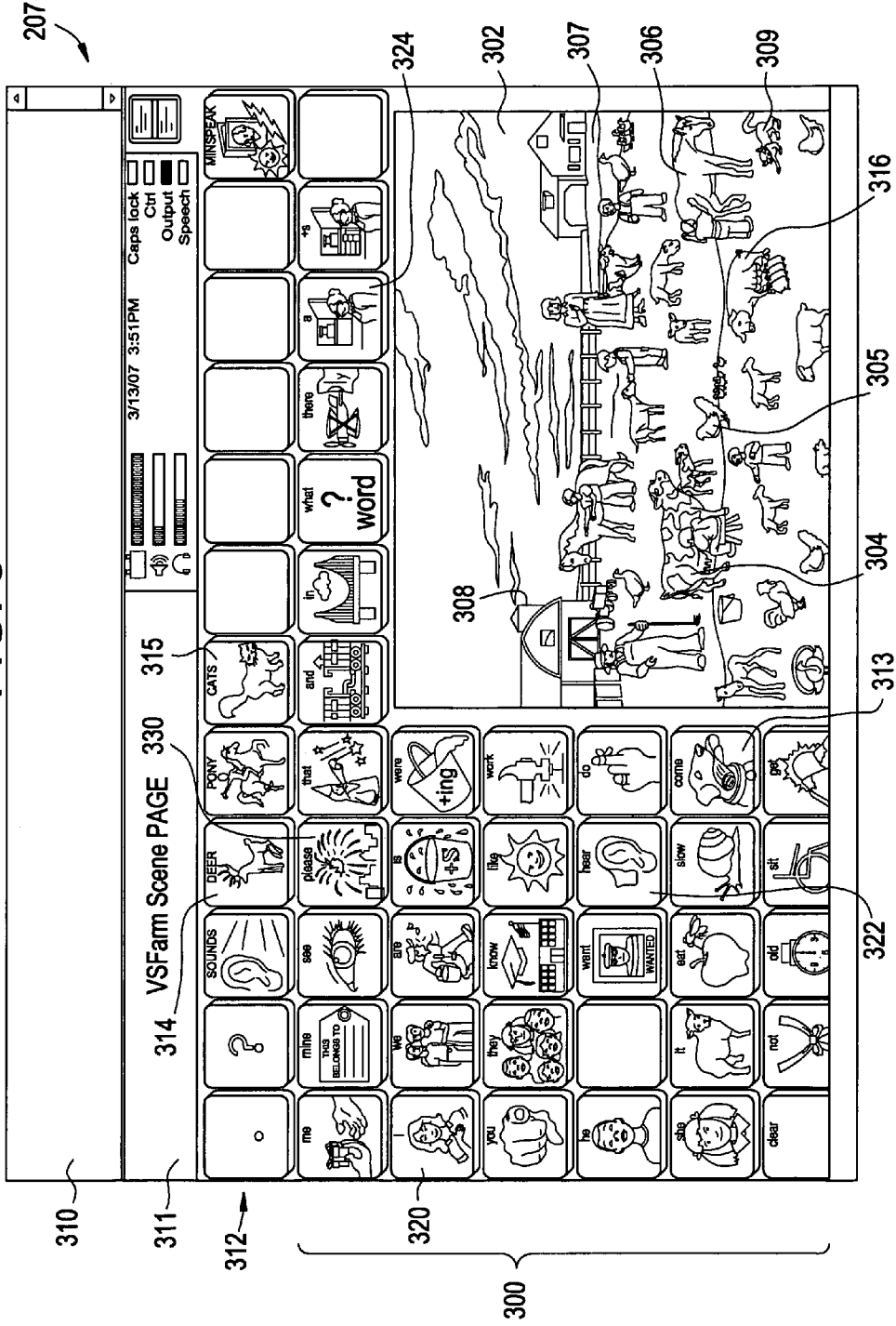
FIG. 3 illustrates an integrated keyboard and display.

The integrated keyboard and display generally designated by 207 (element 207 representing the keyboard 200 integrated with the output unit 7) shown in FIG. 3, contains two significant visual elements: a set of polysemous symbols (on the left and top of the depiction of FIG. 3 generally designated by 300) on a virtual and/or hardwired keys of a keyboard 200 for example; and an embedded visual scene (a VSD on the lower right of the keyboard display of FIG. 3 generally designated by 302).

In at least one embodiment of the present invention, a method and/or device 207 is provided including receiving an indication of selection of a key from a keyboard 200, including at least one of a polysemous symbol and a compilation symbol (such as a Pixon to be described later, for example); and displaying a scene 302 related to the selected at least one of a polysemous symbol and a compilation symbol.

For example, in at least one example embodiment, displaying of the VSD in display area 302, on all or part of the keyboard 200 of integrated input and display 207, can be triggered by selection of one or more polysemous symbol or compilation symbol keys. In at least one embodiment, the dog key  313 can first be selected, corresponding generally to the category of animals. This, in turn, can trigger display of new or previously undisplayed symbols in the activity row 312. For example, a "zoo" symbol key (not shown and corresponding to zoo animals), a "house" symbol key (not shown and corresponding to house pets or animals), and a "farm" symbol key can be displayed in activity row 312b after selection of the "dog" key 313. Thereafter, selection of one of the "zoo" key (not show), "house" key (not shown), and "farm" key can trigger the VSD display 302. For example, selection of the "farm" key can trigger display of the farm scene VSD 302 of FIG. 3, related to the selected "farm" key symbol. Somewhat similarly, selection of the "zoo" key could trigger display of a VSD displaying zoo animals; selection of the "house" key could trigger display of a VSD displaying house pets or animals, etc.

Further, in at least one embodiment, elements or "hot spots" of the VSD can be used to demonstrate or teach a user polysemous symbol sequences. For example, the VSD can display a scene such as the farm scene 302 of FIG. 3, including a plurality of "hot spots" that resemble single meaning symbols (including but not limited to the cow 304, the horse 306 and the barn 308, for example). Thus, these hot spots 304, 306 and 308 may be displayed in the context of a VSD farm scene 302. In one mode, when a "hot spot" (such as the cow 304 for example) is selected in the VSD 302, instead of the "hot spot" accessing a single meaning output, the "hot spot" may instead be used to trigger display of a polysemous symbol sequence useable to access a word, phrase or message corresponding to the "hot spot" (such as the symbol sequence useable to access the cow for example). As such, the context of the VSD 302 is used to teach the user how to communicate, in a non-contextualized manner via the symbol sequence corresponding to the VSD symbol, by offering the user feedback of the symbol sequence needed to generate a word, phrase or message involving the selected "hot spot".

For example, when a user selects the "cow" 304 of the VSD of FIG. 3 for example, the symbol sequence of "dog"+"farm"+"grass"  (313+ (not shown)+"grass" (not shown)) may be displayed to the user, for example in the display bar 311 (or even in activity row 312 of normally blank keys, noting that the activity row 312 currently shows some blank and some non-blank keys in FIG. 3), or conveyed to the user by lighting up the symbol keys in the symbol sequence, etc. It should be noted that the dog+farm+"grass" ( 313+  +(grass, not shown)) symbol sequence can be displayed alone, or in conjunction with the cow symbol to thereby teach the user, in a contextual manner, how to access the "cow" in a de-contextualized manner using sequenced polysemous symbols.

Further, upon selecting the dog+farm ( 313+ ) keys and displaying the farm scene VSD 302 in response thereto, the activity row 312 can also display third new or previously undisplayed symbols in farm animal sequences which, when combined with the dog+farm ( 313+ ) symbols, will access a farm animal word (or if the house or zoo symbols are selected after the "dog" symbol, other third symbols will be accessed and displayed in activity row 312 for example, as third symbols for accessing house or zoo animals). For example, the activity row 312 can display a "grass" symbol, a "corn" symbol and a "seed" symbol. When selecting the polysemous symbol sequence of dog+farm+grass, the word "cow" is output; when selecting the polysemous symbol sequence of dog+farm+corn, the word "pig" is output, and when selecting the polysemous symbol sequence of dog+farm+seed, the word "chicken" is output. As such, the user can see the potential third symbols in the sequence for accessing farm animal words.

Accordingly, upon receiving an indication of selection of a plurality of keys from the keyboard, each including a polysemous symbol, the display can display a scene as VSD 302, with the display occurring subsequent to receipt of an indication of selection of a second key including a polysemous symbol. In addition, a method or device of an embodiment of the present application can include displaying previously undisplayed symbols on a plurality of keys in activity row 312 for example, with the previously undisplayed symbols corresponding to symbols useable to access a stored word, phrase or message when sequenced with the symbols of the selected keys.

Further, when selecting the "cow" 304, or the "chicken" 305 or the "pig" 316 in the VSD 302, the symbol sequence corresponding thereto can be displayed in the display area 311. Alternatively, or in addition thereto, the symbols of the symbol sequence corresponding thereto may be highlighted. As such, the VSD 302 can be used to "feedback" and thus teach symbol sequences to the user.

As such, the context of the VSD may be used to teach symbol sequencing in a de-contextual manner. The context of different VSDs can be first displayed together (a "hot spot" symbols 304, 305, etc. in a VSD 302) and then taken out of context and used to teach the symbol sequencing of polysemous symbols (using the cow symbol 304 to teach the dog+farm+"grass" ( 313+  +(grass, not shown)) symbol sequence for example), thereby teaching access to words, phrases, and messages in a de-contextualized manner. As such, the VSDs are used to teach users a more powerful way of communicating, namely through the use of polysemous symbols sequences, thereby permitting the user with the ability to access a greater number of words, phrases or messages than could be done via VSDs, in a brief number of keystrokes in a de-contextualized manner. Thus, in an example embodiment, a method can include using pictorial context of a display (7/207 for example) to teach de-contextualized sequencing of polysemous symbols of a keyboard (200/207 for example) as explained above.

By first selecting the cow 304, or any other "hot spot" keys of VSD 302, the device 8, including the integrated keyboard/display 207, can recognized and can switch to such a symbol sequence teaching mode. For example, if a symbol sequence is first selected and then the cow 304 or another "hot spot" key is selected thereafter, the word "cow" can be included along with the word, phrase or message accessed by the symbol sequence. However, if the cow 304 or another "hot spot" key is first selected, then the device 8 can recognize a mode switch, and can subsequently display or light up the symbol sequence corresponding to the cow.

In addition, the method of an example embodiment may include receiving an indication of selection of at least one polysemous symbol of the keyboard (200/207 of FIG. 3 for example); and displaying a scene on the display (7/207 of FIG. 3 for example), with the pictorial context of the scene being used to teach de-contextualized sequencing of polysemous symbols of the keyboard (200/207 of FIG. 3 for example). Thus, certain keys can be used to switch the device 8, including the integrated keyboard/display 207, to a mode wherein both a keyboard section 300 and a VSD section 302 are displayed. This can include, for example, selection of a key in activity row 312 for example, including but not limited to the deer 314 (which could trigger the VSD 502 of FIG. 5 for example), the cat 315 (which could trigger the VSD 402 of FIG. 4B for example), etc. In addition, such a selected key could be that of the dice key 406 of FIG. 4A to trigger the cats playing in VSD 402 of FIG. 4B for example, or certain other select polysemous symbols.

Further, in at least one other embodiment, the polysemous symbols 300 can be used to generate words, phrases, etc., which can, in turn, be combined with output generated from areas of the visual scene of the VSD 302. For example, the phrase "I hear a . . . " can be produced by using the polysemous symbols I+EAR+NOUN  320+ 322+ 324) and the words "horse," "chicken," "duck," and "cat" can be generated by subsequently selecting the corresponding image (or 'hot spot') horse 306, chicken 305, duck 307 and cat 309 in the visual scene of the VSD 302.

Figure 4A:
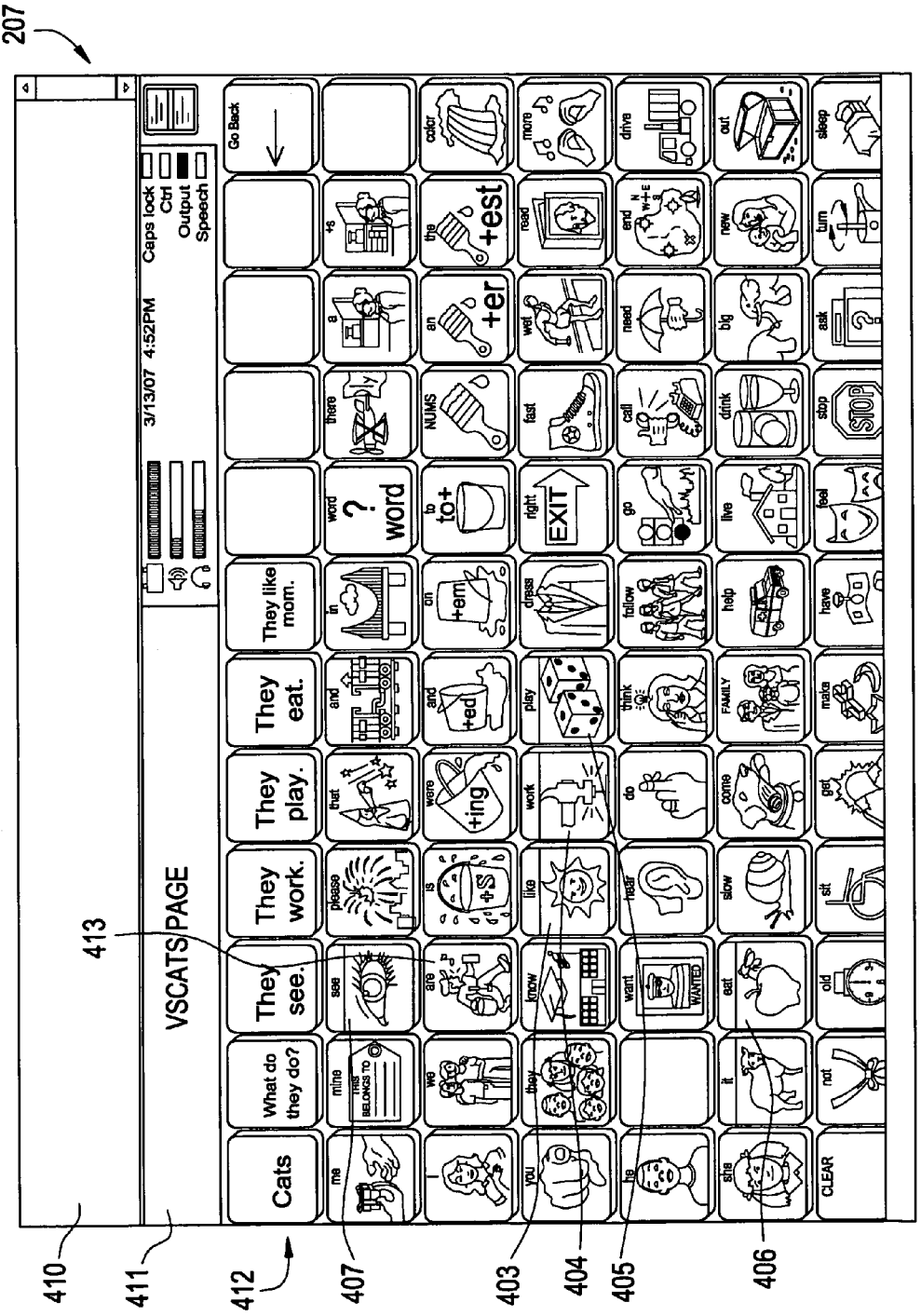
FIGS. 4A and 4B illustrate modified versions of an integrated keyboard and display, with FIG. 4B including an integrated keyboard and display including a VSD in at least a portion thereof.
Figure 4B:
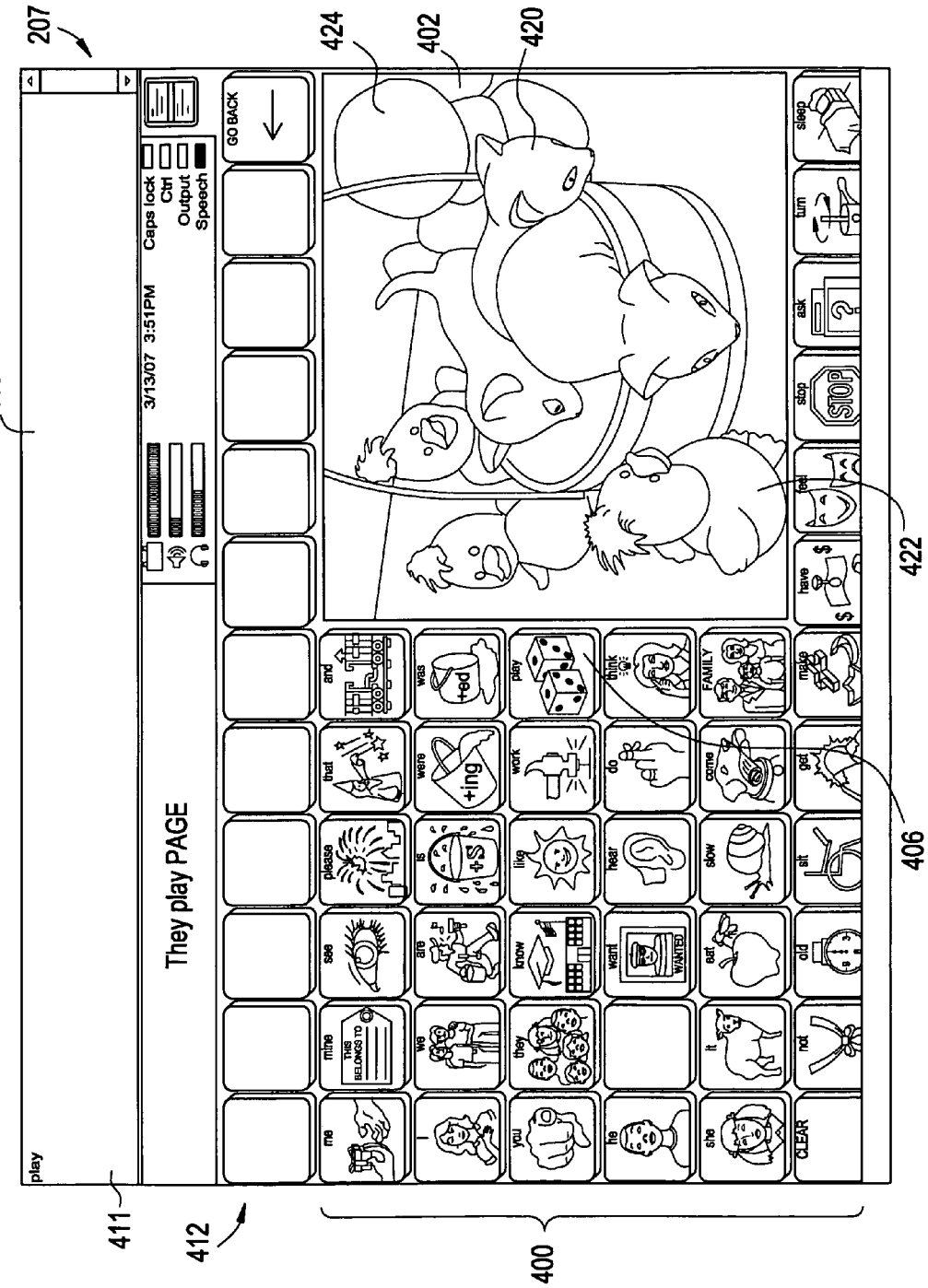

In an example embodiment, the keyboard displays 207 of FIGS. 4A and 4B illustrate a modified version of a standard polysemous symbol vocabulary. The modifications include (a) an addition of a set of questions related to the topic of "Cats" along the activity row of keys 412, and/or (b) highlighting of key words being targeted for teaching. The highlighting may be illustrated by bars on the top portions of the keys for example—"eye" 407 "see," sun 403 "like," hammer 404 "work," dice 405 "play," and apple 406 "eat," noting that the keys may or may not include the words (see, like, work, play, eat, etc.) displayed thereon, and may only include symbols, wherein the highlighting can include highlighting only the symbol itself.

Selecting one of the highlighted key words may act, in at least one embodiment, to convert or link the keyboard display to another keyboard display that includes both a portion 300 of FIG. 4B of polysemous symbol keys and a visual scene element portion 402 of FIG. 4B. As with the example embodiment of FIG. 3, the remaining or new symbols 400 of FIG. 4B may be located in the same location as they were on the standard keyboard overlay of FIG. 4A. Further, the VSD display 402 may be displayed in place of a portion of the keyboard or be displayed concurrent therewith (in place of some of the previously displayed keys of the keyboard for example).

Thus, the polysemous symbol elements may remain consistent not only within a specific activity (in this case, the "Cats" activity), but across activities (e.g. the example keyboard 207 of FIG. 3). This maintains consistency of polysemous symbol elements in relation to position, vocabulary, representation, grammatical function, and other symbol attributes and is one aspect of at least one embodiment of the present application that aids merging of polysemous symbol elements and visual scene displays (VSDs).

In an example embodiment, a method can include receiving an indication of selection of a key from a keyboard 207 (via processor 4 for example), including a polysemous symbol (the dice 406 for example); and displaying a scene 402 related to the selected polysemous symbol (cats "playing" for example, being related to the aspect of "playing" with the dice. Further, the displaying may include displaying a scene 402 relating the selected polysemous symbol to a related group of at least one of words, phrases, and messages (lots of selectable "hot spot" keys relating to aspects of play such as, for example, kitten 420, toy 422, ball 424, etc.), each accessible via a selectable symbol sequence including the selected polysemous symbol. For example, the dice 406 can be the first symbol in sequences for accessing "play" things, wherein a symbol sequence including "dice" plus at least one other symbol accesses the word "cat", dice plus a different symbol accesses the word "toy", etc. Further, selection of the cat 420 or toy 422 "hot spot" can teach and display the corresponding symbol sequence in display area 411 or activity row 412 in a manner similar to that described above with regard to FIG. 3.

Further, in the example embodiment, the method may further include providing an audible output relating the selected polysemous symbol to at least one of a word, phrase, and message, accessible via a selectable symbol sequence including the selected polysemous symbol. The method may further include providing an audible output relating the selected polysemous symbol to a related group of at least one of words, phrases, and messages, each accessible via a selectable symbol sequence including the selected polysemous symbol. Again, the group of selectable symbol sequences may be of a common part of speech (all nouns for example).

In an example embodiment, a method can include receiving an indication of selection of a key from a keyboard 207 (via processor 4 for example), including a polysemous symbol (the dice 406 for example); and displaying a scene 402, on at least a portion of a display 207, relating the selected polysemous symbol to a category of selectable symbol sequences including the selected polysemous symbol as a first symbol. Further, the category of selectable symbol sequences may be useable to access at least one of a word, phrase and message of common parts of speech. In addition, the scene 402 may be displayed on the display 207 either in place of the keyboard (not shown) or concurrent with the keyboard (as shown in FIG. 4B for example). Further, in the example embodiment, the method may further include providing an audible output relating the selected polysemous symbol to a category of selectable symbol sequences including the selected polysemous symbol as a first symbol.

Further, in an example embodiment, a device 8 may include a keyboard 200/207 including a plurality of keys including polysemous symbols; and a display 7/207 to display, on at least a portion thereof 402 and in response to selection of a key including a polysemous symbol (dice 406 for example), a scene 402 related to the selected polysemous symbol (cats "playing" for example, being related to the aspect of "playing" with the dice. Further, the displaying may include displaying a scene 402 relating the selected polysemous symbol to a related group of at least one of words, phrases, and messages (lots of selectable "hot spot" keys relating to aspects of play such as, for example, kitten 420, toy 422, ball 424, etc.), each accessible via a selectable symbol sequence including the selected polysemous symbol. For example, the dice 406 can be the first symbol in sequences for accessing "play" things, wherein a symbol sequence including "dice" plus at least one other symbol accesses the word "cat", dice plus a different symbol accesses the word "toy", etc. Further, selection of the cat 420 or toy 422 "hot spot" can teach and display the corresponding symbol sequence in display area 411 or activity row 412 in a manner similar to that described above with regard to FIG. 3

The device 8 may further include an audible output device 10,14 to provide an audible output relating the selected polysemous symbol to at least one of a word, phrase, and message, accessible via a selectable symbol sequence including the selected polysemous symbol; and/or an audible output relating the selected polysemous symbol to a related group of at least one of words, phrases, and messages, each accessible via a selectable symbol sequence including the selected polysemous symbol. Again, the group of selectable symbol sequences may be of a common part of speech (all nouns for example).

Further, in an example embodiment, the a device 8 may include a keyboard 200/207 including a plurality of keys including polysemous symbols; and a display 7/207 to display, on at least a portion thereof and in response to selection of a key including a polysemous symbol (dice 406 for example), a scene 402 relating the selected polysemous symbol to at least one of a word, phrase, and message, accessible via a selectable symbol sequence including the selected polysemous symbol. The device 8 may further include an audible output device 10,14 to provide an audible output relating the selected polysemous symbol to at least one of a word, phrase, and message, accessible via a selectable symbol sequence including the selected polysemous symbol.

Figure 5:
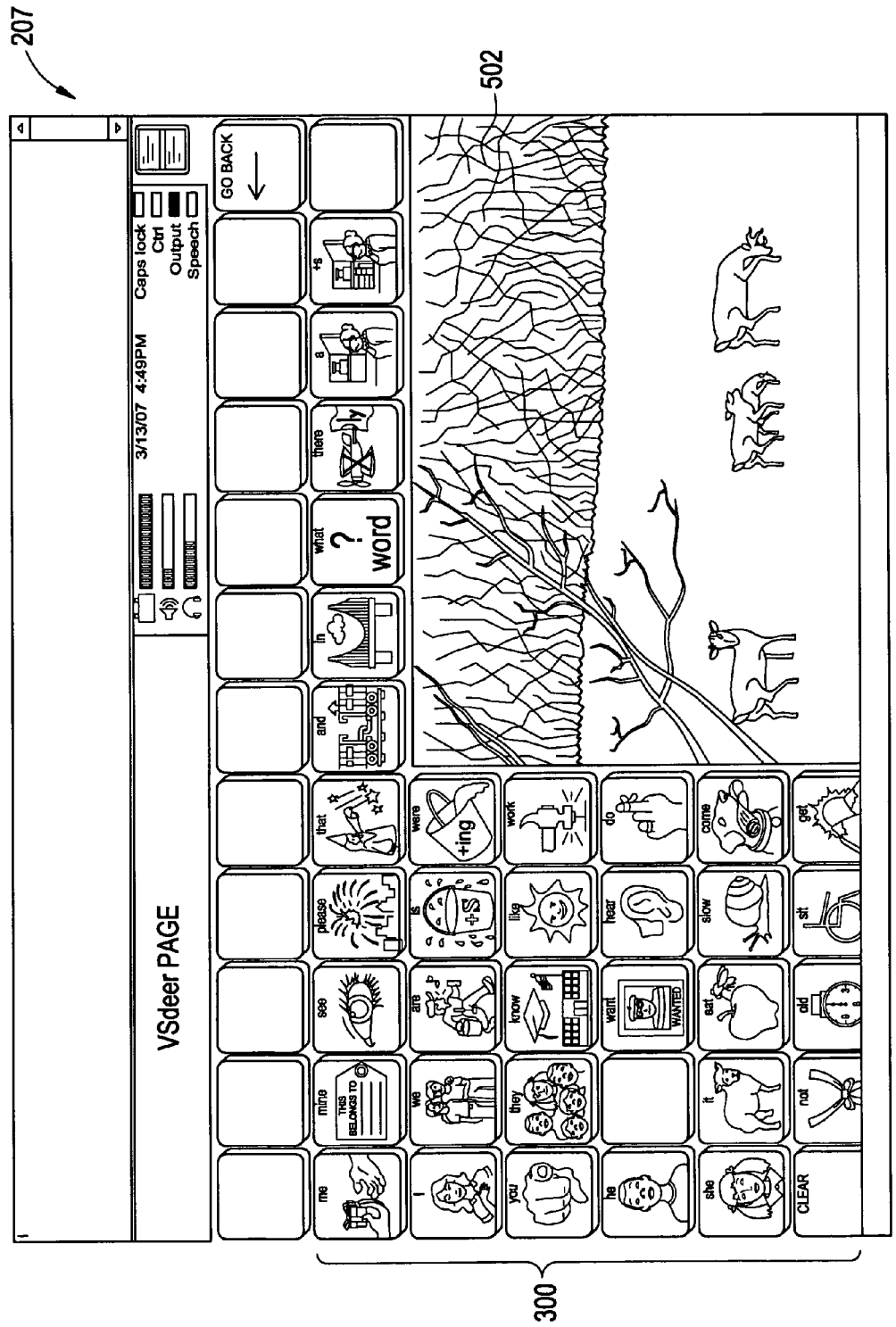
FIG. 5 illustrates modified versions of an integrated keyboard and display including a VSD in at least a portion thereof.

In an example embodiment, the keyboard display 207 of FIG. 5 illustrates a modified version of a standard polysemous symbol vocabulary. This activity keyboard 207 represents deer and can be compared with the farm scene of FIG. 3. The polysemous symbol elements (keyboard display portion 300) is the same, but the visual scene element 502 (with "hot spots") has changed. Once more, the notion of polysemous symbol element consistency, across activities with different VSDs, is supported. Further similar elements are not described again for the sake of brevity.

Embodiments of the present application may involve the use of VSDs, as well as the use of Pixons, as teaching tools for teaching icons (symbols) and icon (symbol) sequences that they are used in, how they relate, link together, etc.; and further may involve the use of VSDs to teach Pixons and icon (symbol) sequences that they are used in, how they relate, link together, etc.

One aspect of an embodiment of this application is to use visual scene displays (VSDs) to teach a potential user of the system (who many times is cognitively impaired in some way, for example) the standard symbols and Pixons in terms of the symbol sequences that they are used in, how they relate differentially to each other, why and how they link together, etc. However, the Pixons can also be used, in at least one embodiment, to teach a potential user symbol sequences corresponding thereto. The teaching tasks may include, but are not limited to:

1) The primary meaning and label of the polysemous icon or composite symbol used to introduce a later polysemous use of the symbol or elements of the symbol
2) The position of the icon in relationship to other icons
3) The attributes and categories suggested by the icon
4) The vocabulary represented by the icons
5) The grammatical relationships between and among icons
6) The semantic, ontological, taxonomic networks of the icons and their arrays
7) The rules underlying the symbol sequencing infrastructure
8) The color patterns of the icons
9) The relationship of semantic icons to grammatical icons
10) The phrase structures using pronouns and verbs
11) The structures and access of phrasal verbs
12) The use of icon prediction in symbol sequencing
13) The use of activity rows in symbol sequencing
14) The use of pop-ups for literate facilitators in teaching symbol sequencing
15) Access strategies for obtaining variations for different parts of speech—tense, comparisons, plurality, case, etc.

A Pixon, as used herein, is a new type of teaching symbol, made from a symbol or icon sequence. A Pixon is mainly a single meaning symbol which is a compilation/integration of at least a last symbol/icon of a Minspeak/Unity polysemous symbol sequence and something else (such as an aspect or metaphor of a known symbol set such as PCS or Mayor Johnson, capturing the idea thereof, and not the expression). For example, a Pixon may be a blend or compilation between a last symbol/icon of a Minspeak/Unity sequence and a PCS symbol and/or may merely blend or compilation of symbols of a Minspeak/Unity sequence. Thus, a Pixon may be known as a compilation symbol relating to a plurality of symbols in a sequence of symbols useable to access at least one of a word, phrase and message.

Figure 6A:
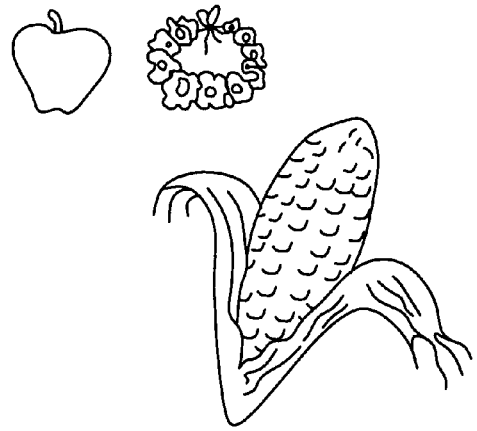
FIGS. 6A-6C illustrate example compilation symbols.

One example of a Pixon shown in FIG. 6A includes a compilation including an "ear" symbol (or a "corn" symbol) on the majority of a key surface, along with two other "signal" icons (in an upper corner, for example), corresponding to a category to which the symbol belongs. For example, the "apple" symbol and the "lei" symbols, when sequenced together, form the vegetable sequence. These symbols can then be displayed in the corner of the "corn" symbol to signify that the sequence "apple"+"lei"+"corn" will output the word corn. Even further, a Pixon compilation can include the "ear" symbol displayed, along with the include the two other "signal" icons (in an upper corner, for example), to signify that the sequence "apple"+"lei"+"ear" will output the word corn (wherein the sequence "apple"+"lei" can be used to activate a dynamic screen or activity row of symbols including corn, spinach, etc. to access vegetables such as corn, spinach, etc. as discussed in the Baker '303 patent, the entire contents of which are incorporated herein by reference).

Figure 6B:
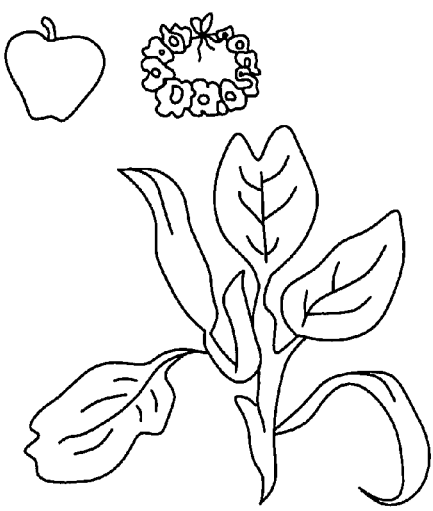

Some other example Pixons are shown in FIGS. 6B (spinach) and 6C (cauliflower).

Figure 6C:
Figure 6C:
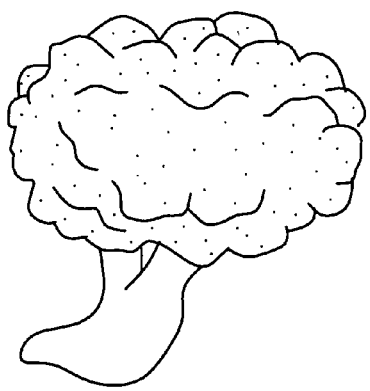

Alternatively, instead of displaying all three symbols of a sequence (noting that three is merely an example, wherein two, three, four, etc. symbols can be sequenced together to output a word, phrase, etc.) on a key as shown in FIGS. 6A-6C for example, a compilation Pixon symbol can be displayed which combines, embellishes upon, and/or incorporates portions of at least one symbol (usually a last symbol in a sequence) of a symbol sequence and/or metaphors commonly used in other symbol sets such as PCS for example (kind of a new compilation single meaning symbol). Such Pixons can be used to more easily teach symbol sequences to a user by reminding the user of different aspects of the sequence category and of the sequence result. Further, if combined with an idea of other commonly used symbol sets, such Pixons can aid a teacher in teaching symbol sequences, who may be familiar with those known symbol sets, such as PCS for example.

Figure 7A:
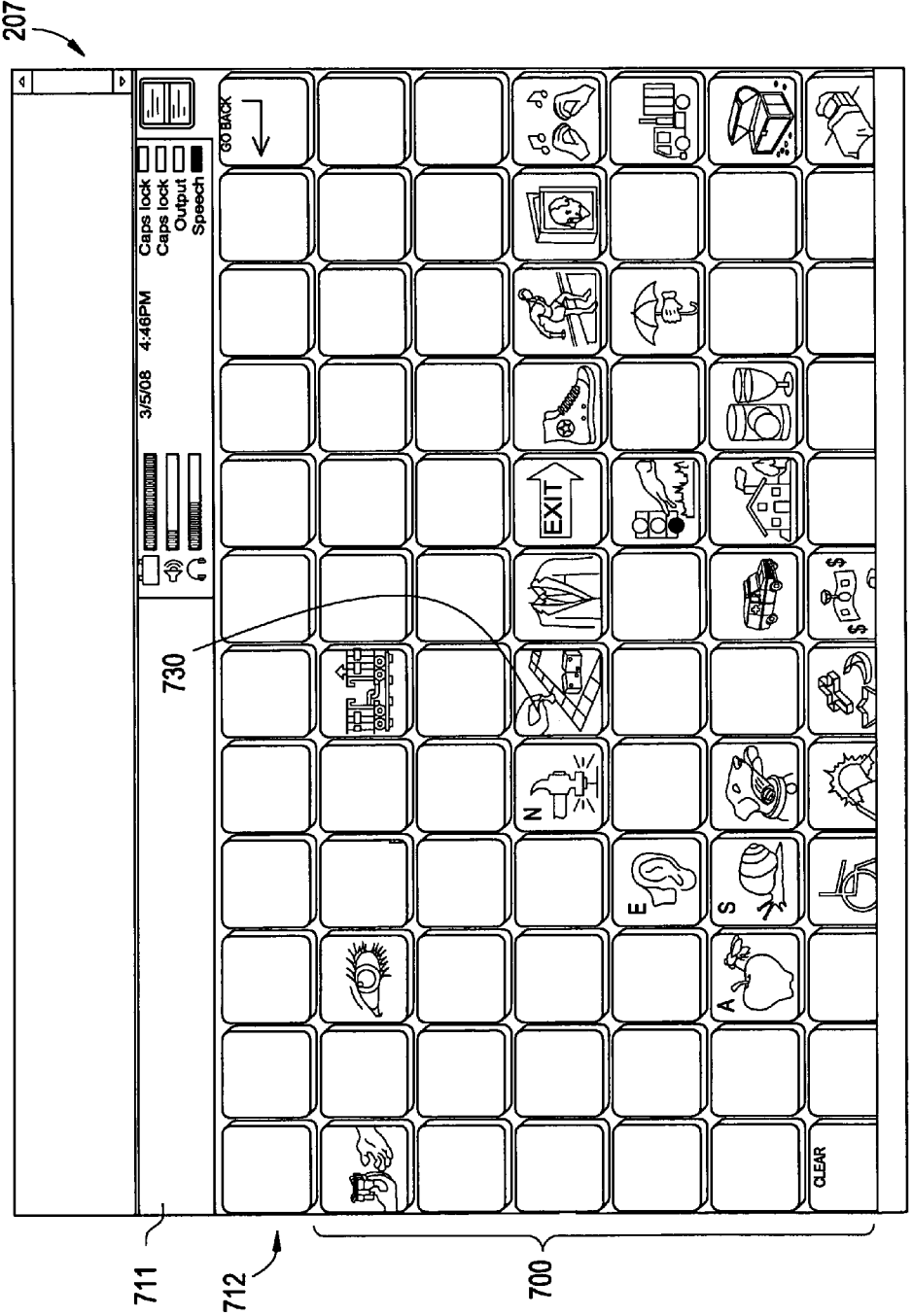
FIGS. 7A-C illustrate modified versions of an integrated keyboard and display including at least one compilation symbol, with FIGS. 7B and 7C including an integrated keyboard and display including a VSD in at least a portion thereof.
Figure 7B:
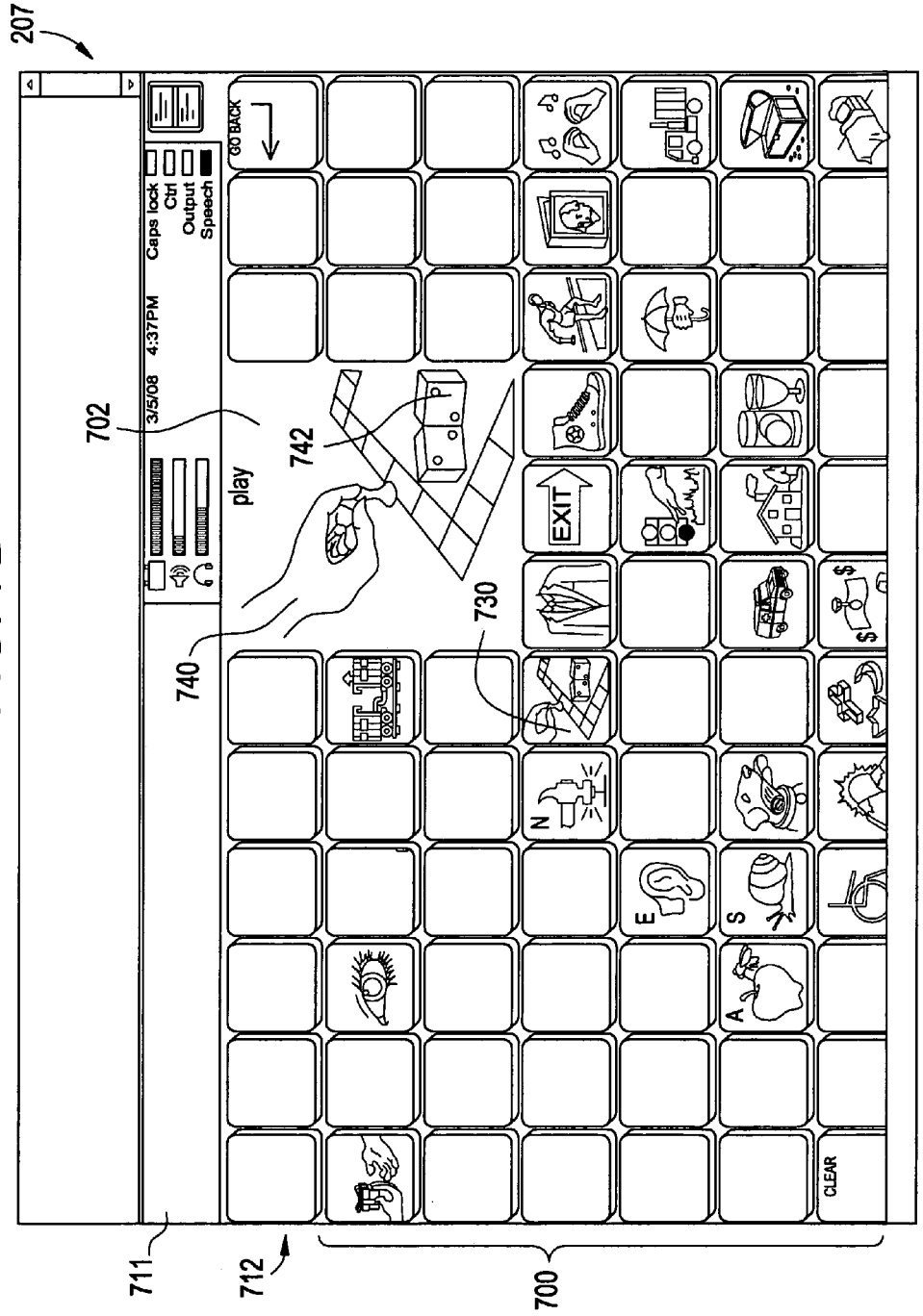
Figure 7C:
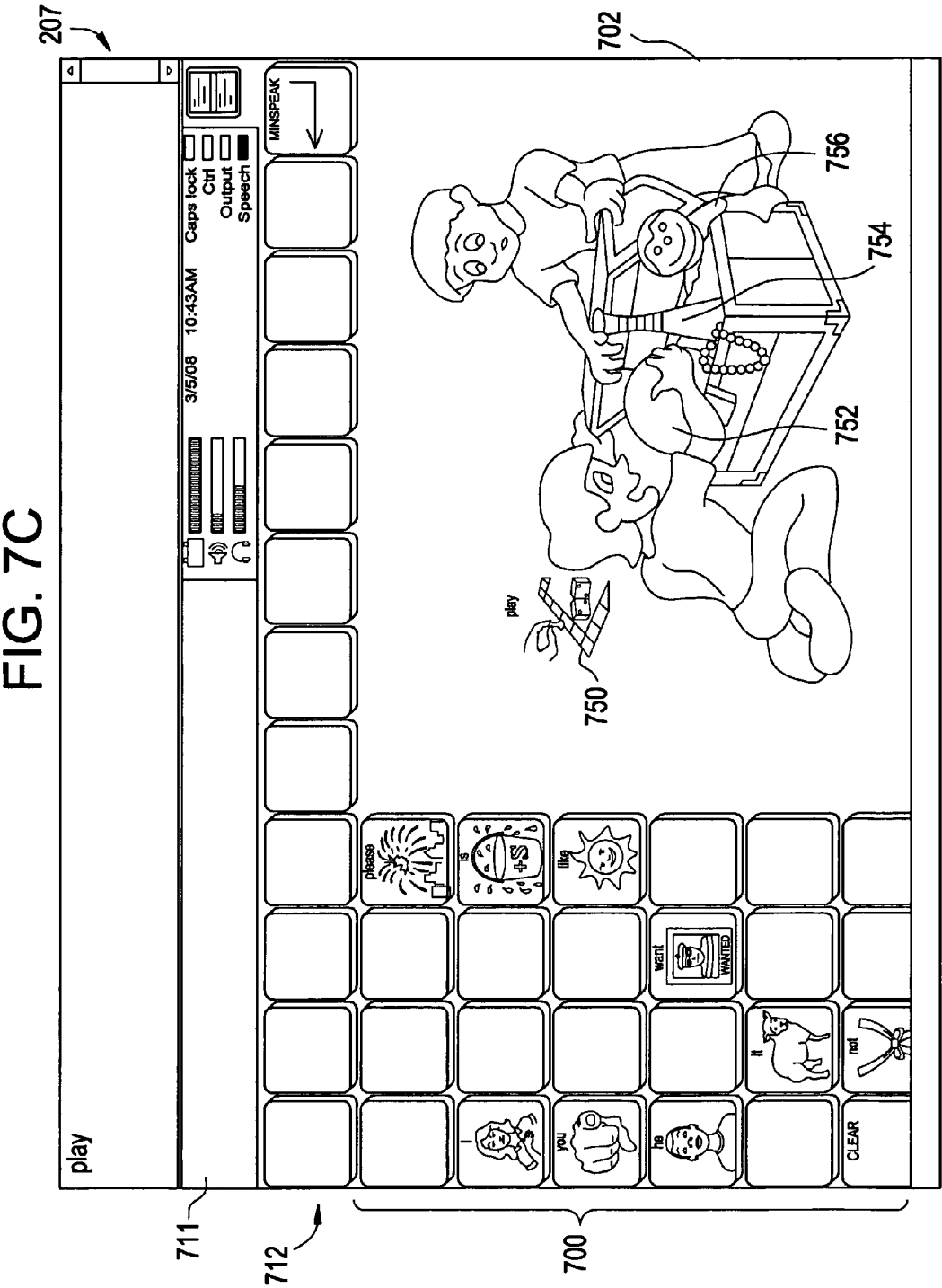

FIG. 7A-C illustrate an embodiment of the present application relating to Pixons. For example, the device 8 including the integrated input and display 207 of FIG. 7A, includes a display area 711, an activity row 712, and a general keyboard area 700 including a plurality of polysemous symbols. Further, the keyboard area 700 includes at least one Pixon key 730. This key 730 includes the Pixon for "play" for example.

Once the Pixon for 730 is selected, the keyboard area 700 of FIG. 7A may display a VSD 702 in a portion thereof as shown in FIGS. 7B and 7C. for example. The VSD can be an enlarged version of the Pixon as shown by 702 of FIG. 7B, and can include "hot spots" 740, 742 which operate in the manner previously described with regard to FIGS. 3, 4 and 5 for example. Further, the VSD may include the Pixon itself 750, embedded in the VSD. Upon selection of the Pixon, the symbol sequence of polysemous symbols usable to output the word "play" may be displayed, in the display area 711 or in the activity row 712 for example. In addition, the VSD 702 may include not only the Pixon 750, but other "hot spots" such as items on can play with. These can include but are not limited to the ball 752, the bat 754 and the doll 756.

Thus, a method of an embodiment of the present application includes receiving an indication of selection of a key from a keyboard 200 (via processor 4 for example) which includes a compilation symbol (such as the Pixon for play on key 730 for example) relating to a plurality of symbols in a sequence of symbols useable to access at least one of a word, phrase and message (the Pixon for play may be a compilation of several symbols such as dice 406 of FIG. 4A for example and Mr. Action Man 413 of FIG. 4A for example which, when sequenced together, form a symbol sequence to access the word "play"); and displaying a scene (such as in area 702 of FIG. 7B for example), including the compilation symbol 730, relating the selected compilation symbol to the accessible at least one of a word, phrase and message. Such a scene 702 may be displayed at least one of in place of the keyboard 200/207 and/or displayed concurrent with the keyboard 200/207 (as shown by element 702 of FIG. 7A for example). Finally, the method may include providing an audible output relating the selected compilation symbol to the accessible at least one of a word, phrase or message.

Further, in an example embodiment, a device 8 may include a keyboard 200/207 including a plurality of keys, at least one key including a compilation symbol (such as the Pixon for play on key 730 for example) relating to a plurality of symbols in a sequence of symbols useable to access at least one of a word, phrase and message; and a display 7/207 to display, on at least a portion thereof and in response to selection of a key including a compilation symbol, a scene 702 relating the selected compilation symbol to the accessible at least one of a word, phrase, and message. The device 8 may further include an audible output device 10,14 to provide an audible output relating the selected compilation symbol to the accessible at least one of a word, phrase, and message.

For example, the farm scene 302 of FIG. 3 can include, in at least one embodiment, a corn symbol either as shown in FIG. 6A with the apple and lei symbols located slightly above the corn (wherein the entire group of three symbols is an accessible "hot spot" for example); and/or can include a different type of compilation symbol, resembling the corn, but further combining in aspects of the apple and lei symbol). In either event, by displaying either type of Pixon in the context of the farm sequence, the Pixon is related to the accessible word, phrase or message. By receiving an indication of selection of the Pixon (via processor 4 for example), the device can help to teach, using the farm context, access to the word, phrase or message in a de-contextual manner (namely be teaching the use of the polysemous symbol sequence).

Figure 8A:
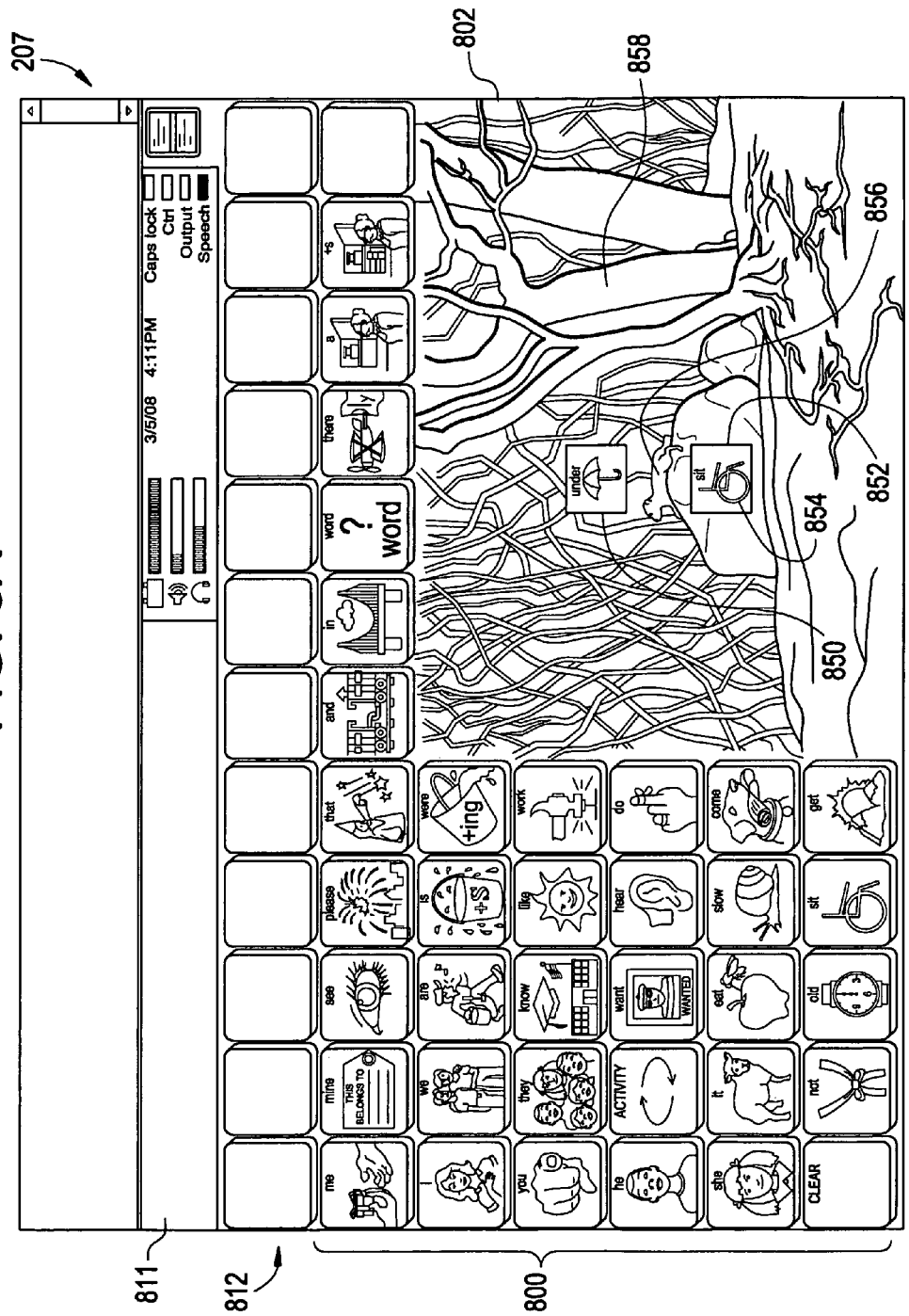
FIGS. 8A-B illustrate modified versions of an integrated keyboard and display including at least one compilation symbol, with FIG. 8B including an integrated keyboard and display including a VSD in at least a portion thereof.
Figure 8B:
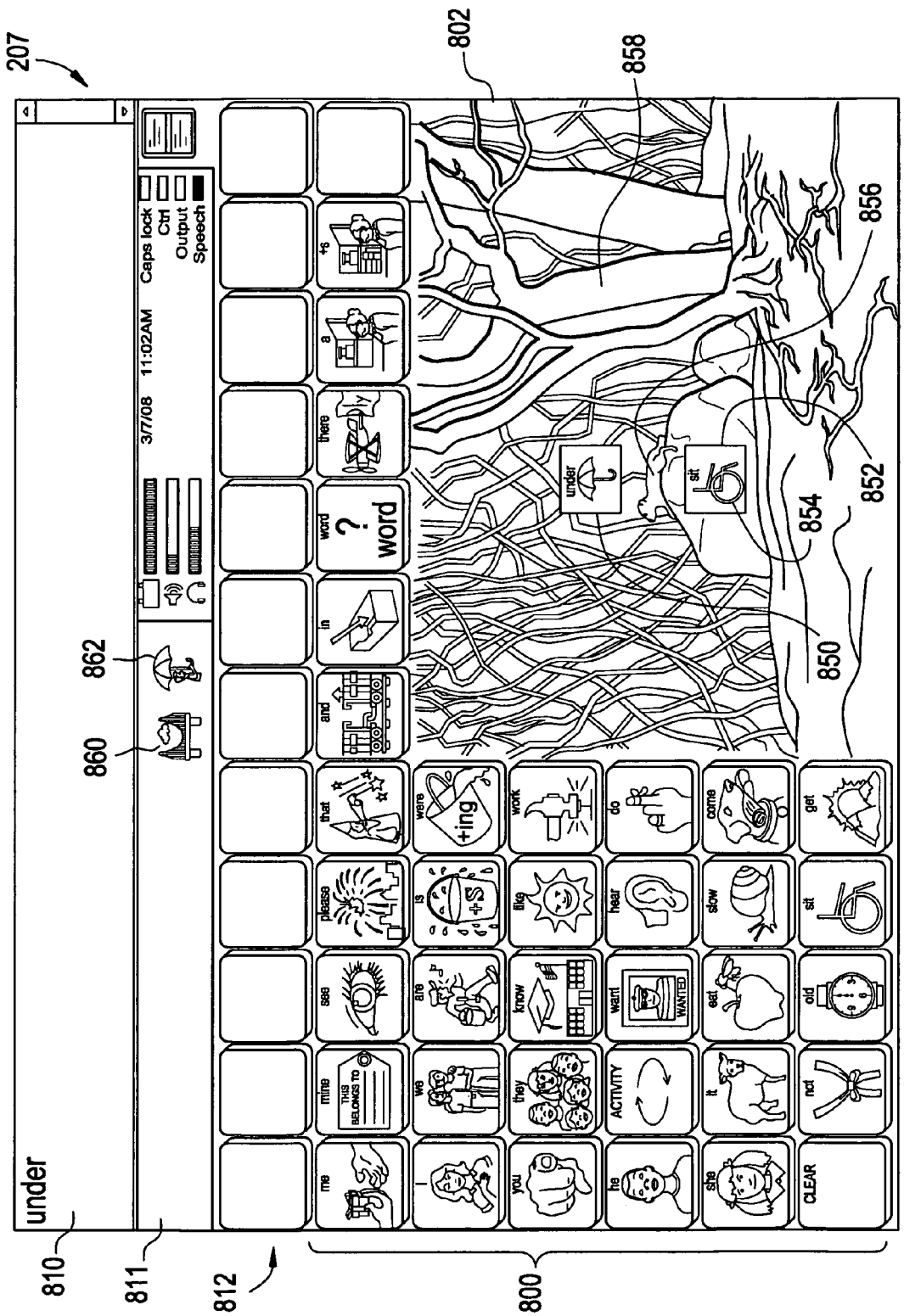

FIGS. 8A and 8B show one example of Pixons embedded in a VSD. The integrated and display device 207 of device 8 includes a text feedback display area 810, a display area 811, an activity row 812 and a keyboard area 800. The VSD is shown by element 802 in FIGS. 8A and 8B.

The VSD 802 can include "hot spots" 850, 852, 854, 856, and 858, which operate in the manner previously described with regard to FIGS. 3, 4 and 5 for example, at least some of which are Pixons. In the VSD 802, Pixons for "under" 850 (corresponding to the polysemous symbol sequence of bridge 860 and umbrella 862 of FIG. 8B for example) and "on" 852 (corresponding to the polysemous symbol sequence of bridge 860 plus wheelchair 864 of FIG. 8B for example) are shown, along with a rock 854, a desert animal 856 and a tree 858. Thus, in the VSD, the Pixon 850 is shown "under" the tree 858 and the Pixon 852 in "on" the rock 852.

FIG. 8B further illustrates, in one example embodiment, what can happen when the Pixon 850 for "under", embedded in VSD 802, is activated or selected. In this example embodiment of FIG. 8B, the word "under" is displayed in the text display area 810 and a polysemous symbol or icon sequence useable to generate the word "under" is shown or fed back to the user in display area 811 (as icon 860 of the bridge, and icon 862 of the man with the umbrella). Instead of or in addition to the display, an audible output could be included, the keys of the symbols of the sequence shown in area 811 could be highlighted, etc. As such, selection of the Pixon from the VSD can aid a user in understanding the symbol sequence corresponding thereto.

Thus, a method of at least one embodiment includes receiving an indication of selection of a key from a keyboard 200/207 (via processor 4 for example), including a compilation of a plurality of symbols (such as that shown in any of FIGS. 6A-8B for example or such as symbols 860 and 862 forming sequences corresponding to the "under" Pixon 850 for example) which, when sequenced together, are usable to access at least one of a word, phrase and message; and displaying a scene 802, relating the selected compilation of a plurality of symbols to the accessible at least one of a word, phrase, and message (by displaying Pixon 850 or 852 for example). Such a scene may be displayed in place of the keyboard 200/207 and/or concurrent with the keyboard 200/207. The method may further include providing an audible output relating the selected plurality of symbols to the accessible at least one of a word, phrase, and message.

A device 8 of at least one embodiment may include a keyboard 200/207 including a plurality of keys 800, at least one key including a compilation of a plurality of symbols (such as that shown in any of FIGS. 6A-8B for example or such as a keys 860 and 862 forming sequences corresponding to the "under" Pixon 850 for example) which, when sequenced together, are usable to access at least one of a word, phrase and message; and a display 207 to display, on at least a portion thereof and in response to selection of a key including a compilation of a plurality of symbols, a scene 802 relating the plurality of symbols to the accessible at least one of a word, phrase, and message. The device 8 may include an audible output device 10/14 to provide an audible output relating the selected key including the plurality of symbols to the accessible at least one of a word, phrase, and message.

Further, such Pixons can be used by teachers, parents, etc. in a manner similar to single meaning symbols, but can be used to teach the polysemy of the symbols and sequences, and not just the direct one to one association of a symbol and a word. For example, a teacher currently may place a corn symbol on an ear of corn. But with the Pixon, instead of just a single meaning PCS symbol, the user can learn the language of sequencing polysemous symbols together, and thus can learn the vegetable category (apple+lei keys), and the rich association between different combinations of polysemous (multi-meaning) symbols.

Figure 9:
FIG. 9 illustrates example Pixons.
Figure 9:
Figure 9:
Figure 9:
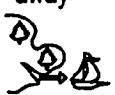
Figure 9:
Figure 9:
Figure 9:
Figure 9:

Some non-limiting and non-exclusive example Pixons are shown in FIG. 9.

Pixons may be designed to be used for (1) manual communication boards (2) environmental engineering materials; and (3) with educational tools, such as IntelliTools or Writing with Symbols, (4) flashcards, etc. As such, Pixons will provide pictures for core vocabulary and a broad range of extended vocabulary.

Some example Pixons blend last symbols of polysemous symbol (Minspeak/Unity) sequences with metaphors commonly used in other symbol sets such as PCS. For example for the word "across", the symbol sequence is bridge+shoe. Thus, the last symbol is the shoe. However, the Pixon embellishes on the shoe symbol, and shows it with the laces "crossed" to represent "across".

The Pixon for "again" combines the last Minspeak/Unity symbol in a sequence of adverb+hotpot, with a metaphor of the PCS symbol. Here, the hotpot has a ring over it. The Pixon uses this ring and combines it with the idea (not the expression) of using arrows, which is done in PCS. The Pixon is thus a ring of arrows. The Pixon for "around" shows a similar blend.

As such, teachers familiar with PCS will be able to create charts and use Pixons of at least one embodiment of the present application in a manner similar to that used with other single meaning symbols, but with the benefits and aim to teaching polysemous symbols and sequences of Minspeak/Unity.

Thus, a method of at least one embodiment includes receiving an indication of selection of a compilation symbol relating to plurality of symbols in a sequence of symbols (via processor 4 for example), usable to access at least one of a word, phrase and message; and using the compilation symbol to teach someone the symbol sequence, usable to access at least one of a word, phrase, and message. In at least one other embodiment, a method includes receiving an indication of selection of a compilation symbol (via processor 4 for example), including a plurality of symbols which, when sequenced together, are usable to access at least one of a word, phrase and message; and using the selected compilation symbol, including the plurality of symbols, to teach someone the symbol sequence, usable to access at least one of a word, phrase, and message.

One example purpose for developing this set of pictures is to assist in the adoption of and eventual transition to a polysemous symbol sequencing device by providing a "friendly" picture option for use on low-tech and early AAC system development. By introducing Pixons as an initial symbol set, the child and the support team will be gaining familiarity with pictures that will appear later on an AAC device (including the polysemous symbols), while also learning something about the organizational strategy for retrieving that vocabulary in an AAC device. Pixons could also be a low-cost means of introducing AAC in emerging countries.

In at least one embodiment, this initial introduction to and adoption of Pixons could (1) encourage investment in a systematic, consistent, life-long AAC language program and (2) ease anxieties over the transition from low tech AAC intervention to use of more sophisticated voice output technology.

In at least one embodiment, Pixons are intended to be used prior to the introduction of high tech AAC voice-output technology (which uses polysemous symbol sequences to access stored words, phrases, etc.). They are to be used to make manual communication boards, to make displays for low-tech devices (e.g., from Unlimiter), to develop environmental engineering materials, and to make educational support materials, such as IntelliTools applications or low tech materials, such as books or games.

In at least one embodiment, professionals (SLPs, OT, Educators) and families could be targeted, who make initial AAC decisions about vocabulary selection and early AAC system development. The actual Pixon pictures can be targeted for young AAC device users and individuals with significant cognitive disabilities.

The Pixons, in at least one embodiment, may provide a picture system that at least one of:
  is perceived as simply a "set of pictures;"
  feels familiar to people who are currently using PCS because of drawing conventions used and similar, universal metaphors;
  is perceived to be "easy," cute, contemporary, and kid friendly;
  provides pictures for early developing core language concepts with teachable, clear, translucent relationships between the picture and the concept;
  is flexible enough to allow for easy customization of the vocabulary; and
  coordinates with current AAC software that is used for making manual communication boards, environmental engineering materials (e.g., Boardmaker), and educational support materials.

In at least one embodiment, some example project developments for use of Pixons may include:
  1. The project coordinator can coordinate a discussion of this project to clarify the project, define principles, and establish a project plan.
  2. The project coordinator can, for example, select 500+ core words commonly used on manual communication boards and for environmental engineering (e.g., environmental labeling, environmental communication displays, environmental sentence strips, choice boards, visual schedules, etc.).
  3. The project coordinator can develop guidelines and principles for drawing the new pictures for a transition to the selected Unity programs.

Thus, using Pixons, a method can be developed in at least one embodiment, to relate a compilation symbol to an accessible at least one of a word, phrase, and message (accessible via a polysemous symbol sequence for example). The method can include receiving an indication of selection of a key from a keyboard (via processor 4 for example), including a compilation symbol relating to plurality of symbols in a sequence of symbols usable to access at least one of a word, phrase and message; and displaying a scene, including the compilation symbol, relating the selected compilation symbol to the accessible at least one of a word, phrase, and message. Further, the scene may be displayed in place of the keyboard, in the case of using a virtual keyboard for example, and/or the scene may be displayed concurrent with the keyboard, when using a virtual or a regular hardwired keyboard for example. The method may further include providing an audible output relating the selected compilation symbol to the accessible at least one of a word, phrase, and message.

Further, using Pixons, a device 8 including a display can be developed in at least one embodiment. The display can display, on at least a portion thereof, a virtual keyboard including a plurality of keys, at least one key including a compilation symbol relating (such as a Pixon 850 or 852 for example) to plurality of symbols in a sequence of symbols usable to access at least one of a word, phrase and message. The display can further be used to display, on at least a portion thereof and in response to selection of a virtual key including a compilation symbol, a scene 802 relating the selected compilation symbol to the accessible at least one of a word, phrase, and message. Alternatively in another embodiment, the device can include a separate keyboard, for example, including a plurality of keys, at least one key including a compilation symbol relating to plurality of symbols in a sequence of symbols usable to access at least one of a word, phrase and message. An audible output device can further be included with either embodiment, to provide an audible output relating the selected compilation symbol to the accessible at least one of a word, phrase, and message.

In addition, using Pixons, a method can be developed in at least one embodiment, wherein a compilation symbol is selected, relating to plurality of symbols in a sequence of symbols, usable to access at least one of a word, phrase and message. Thereafter, the compilation symbol can be used to teach someone the symbol sequence, usable to access at least one of a word, phrase, and message. Alternatively, the method of at least one embodiment can include receiving an indication of selection of a compilation symbol (via processor 4 for example), including a plurality of symbols which, when sequenced together, are usable to access at least one of a word, phrase and message; and using the selected compilation symbol, including the plurality of symbols, to teach someone the symbol sequence, usable to access at least one of a word, phrase, and message. Devices 8 to implement either method can also be provided in at least one embodiment, with either or both of virtual and hard-wired keyboards.

In at least one example embodiment, the style of the Pixon drawings might have some "familiarity" to PCS icons, such as conventions and features (e.g., arrows) that are commonly used in PCS. The Pixons should be kid friendly and use metaphors that are teachable to young and low functioning children and adults.

In at least one example embodiment, the Pixons should be clean of any unnecessary visual details. They should, for example, lack shadows, highlighting or extra details. Details not essential to the metaphor being represented end up looking like clutter when the pictures are reduced in size and placed on communication boards. Too much color in the drawing, when color isn't necessary, further makes the communication board look more "patchwork" when they are placed on a color-coded manual board. When possible, the colors should be kept to a minimum.

In at least one example embodiment, arrows should be black unless otherwise noted. This convention is desired. Further, black pops out better on a color-coded background. Further, negation should be red (red "KNOT", red X, etc.). The icons can be sized, for example, at 0.5 inch and 1 inch to see what they look like and make sure they do not lose details when they are sized to the size they most likely will be when placed on a robust, personal, manual communication board. When detail is lost at a size this small, it will be fixed before going to a "final" Pixon.

The Pixon, in at least one example embodiment, may include an icon name which matches the word above the Pixon, so that it is easy to find the icon on the CD/Program. The word above should be "flexible." The word above the Pixon should be changeable, such that the picture aspect of the Pixon can be placed on the board with or within the printed word, etc. As these icons go into a device, they should adhere to the "rules" of how icon names work in PRC devices.

I. Non-Limiting Examples Using Minspeak® Visual Scene Displays (MVSD) to Teach Language Structures There are many types of phrase structures and other structural relationships in language which need to be mastered before a person can gain a sense of fluency in communication. The VSDs (such as those shown above for example) used in conjunction with the polysemous symbols can be used to teach many phrase and general language structures.

The identification of prepositional vocabulary: in one example embodiment, a visual scene display (VSD) can feature a desert scene with animals that populate the desert in various positions around typical desert features—rocks, flora, etc. As one example, the Pixon for "on" can be positioned in the VSD next to an animal which is sitting "on a rock." Further, the Pixon for "under" can be illustrated next to a spider that is "under a leaf." In this manner, the common prepositions with spatial metaphors can be taught in terms of the Unity® Pixon which represents each preposition.

A visual scene can be used to illustrate action words in time. Present, past, future, near future, present continuous, infinitive, participle, and gerund forms can be visualized and related to icon sequences, individual icons, and Pixons.

II. Non-Limiting Examples Using VSDs to Teach Standard and Activity Icons, Embellished Icons, Pixons and their Vocabulary The Unity® Minspeak Application Program (MAP™) features a variety of icons (polysemous symbols) which are used in sequences, icons which are used singly, icons that are embellished to portray meaning, Pixons which portray icon sequences, and thousands of vocabulary words. The MVSD (Minspeak VSD) can be used to introduce and teach all of the above Unity® features to non-reading, reading, cognitively impaired, cognitively intact clients. They can also be used to assist teachers, clinicians, and family in dealing with vocabulary and icons.

An. MVSD can be designed and created to teach core vocabulary and concepts used within daily environments, activities, topics, and situations. Use of Pixons and icons within MVSDs can be selected and organized to teach primary meanings associated with the Pixon or icon and then secondary or multiple meanings associated with the Pixon or icon to build vocabulary, sequencing skills, motor patterns and provide for smooth transitions into the levels of the Unity® Minspeak Application Program (MAP™).

An. MVSD can be designed and created to teach extended vocabulary associated with Pixons or icons and accessed from the activity row. Use of Pixons and icons within MVSDs can be selected that will lead to vocabulary associated with a category on the activity row (e.g. apple icon leads to various food categories such as breakfast, lunch, snacks, etc.).

An. MVSD can be designed and created to teach social language skills appropriate for the selected environment, activity, topic or situation. Use of Pixons and icons within MVSDs can be selected and organized to generate spontaneous novel utterances appropriate for the MVSD or scripted utterances programmed on the activity row.

Thus, a method of an embodiment of the present application includes receiving an indication of selection of a key from a keyboard 200 (via processor 4 for example) which includes a compilation symbol (850 or 852 of FIG. 8 for example) relating the selected compilation symbol to a plurality of symbols in a sequence of symbols useable to access at least one of a word, phrase and message; and displaying a scene (such as in area 802 of FIG. 8 for example), including the compilation symbol (850 or 852 of FIG. 8 for example), relating the selected compilation symbol to the accessible at least one of a word, phrase and message. Such a scene 802 may be displayed at least one of in place of the keyboard 200/207 and/or displayed concurrent with the keyboard 200/207 (as shown by elements 800 and 802 of FIG. 8 for example). Finally, the method may include providing an audible output relating the selected compilation symbol to the accessible at least one of a word, phrase or message.

Further, in an example embodiment, a device 8 may include a keyboard 200/207 including a plurality of keys, at least one key including a compilation symbol (850 or 852 of FIG. 8 for example) relating to a plurality of symbols in a sequence of symbols useable to access at least one of a word, phrase and message; and a display 7/207 to display, on at least a portion thereof and in response to selection of a key including a compilation symbol, a scene 802 relating the selected compilation symbol to the accessible at least one of a word, phrase, and message. The device 8 may further include an audible output device 10,14 to provide an audible output relating the selected compilation symbol to the accessible at least one of a word, phrase, and message.

Further, a method of at least one other embodiment includes receiving an indication of selection of a key 300 from a keyboard 200/207 (via processor 4 for example), including a plurality of symbols (such as that shown in any of FIGS. 6A-6C for example) which, when sequenced together, are usable to access at least one of a word, phrase and message; and displaying a scene 302, including the selected key, relating the selected plurality of symbols to the accessible at least one of a word, phrase, and message. Such a scene may be displayed in place of the keyboard 200/207 and/or concurrent with the keyboard 200/207. The method may further include providing an audible output relating the selected plurality of symbols to the accessible at least one of a word, phrase, and message.

A device 8 of at least one embodiment may include a keyboard 200/207 including a plurality of keys 300, at least one key including a plurality of symbols (such as that shown in any of FIGS. 6A-6C for example) which, when sequenced together, are usable to access at least one of a word, phrase and message; and a display 207 to display, on at least a portion thereof and in response to selection of a key including a plurality of symbols, a scene 302 relating the selected key including the plurality of symbols to the accessible at least one of a word, phrase, and message. The device 8 may include an audible output device 10/14 to provide an audible output relating the selected key including the plurality of symbols to the accessible at least one of a word, phrase, and message.

Still further, a method of at least one embodiment includes receiving an indication of selection of a compilation symbol relating to plurality of symbols in a sequence of symbols (via processor 4 for example), usable to access at least one of a word, phrase and message; and using the compilation symbol to teach someone the symbol sequence, usable to access at least one of a word, phrase, and message. In at least one other embodiment, a method includes receiving an indication of selection of a compilation symbol (via processor 4 for example), including a plurality of symbols which, when sequenced together, are usable to access at least one of a word, phrase and message; and using the selected compilation symbol, including the plurality of symbols, to teach someone the symbol sequence, usable to access at least one of a word, phrase, and message.

Still further, a method of at least one embodiment includes receiving an indication of selection of a key from a keyboard 200/207, including at least one of a polysemous symbol (for example, 300, 400, 700, 800, etc.) and a compilation symbol (for example, a Pixon of FIGS. 6A-C, 730, 850, 852, etc.); and displaying a scene (for example, 302, 402, 502, 702, 802, etc.) related to the selected at least one of a polysemous symbol and a compilation symbol. The displaying may include displaying a scene (for example, 302, 402, 502, 702, 802, etc.) including the selected at least one of a polysemous symbol and a compilation symbol (for example, 850, 852, etc.). The compilation symbol may be a compilation of a selectable symbol sequence. The method may further include providing an audible output relating the selected at least one of a polysemous symbol and a compilation symbol to at least one of a word, phrase, and message, accessible via a selectable symbol sequence.

Still further, a device 8 of at least one embodiment may include a keyboard 200/207 including a plurality of keys including at least one of at least one polysemous symbol (for example, 300, 400, 700, 800, etc.) and at least one compilation symbol (for example, a Pixon of FIGS. 6A-C, 730, 850, 852, etc.); and a display 7/207 to display, on at least a portion thereof and in response to selection of a key including at least one of a polysemous symbol and a compilation symbol, a scene (for example, 302, 402, 502, 702, 802, etc.) related to the selected at least one of a polysemous symbol and a compilation symbol. The device 8 may further include an audible output device 10,14 to provide an audible output relating the selected at least one of a polysemous symbol and a compilation symbol to at least one of a word, phrase, and message, accessible via a selectable symbol sequence.

III. Examples Using MVSD and LAM to Enhance Teaching Modes

Language Activity Monitoring (LAM) is the automatic recording of AAC system events along with a time stamp. The basic method provides for monitoring the communication activity during teaching and use of an AAC system in daily environments. LAM is distinctive from other automatic data logging methods by the incorporation of a three letter mnemonic that provides for the identification and analysis of the language representation methods (LRMs) used to generate spontaneous novel utterances. In addition, because of the time stamp, LAM data provides a record to distinguish between the use of spontaneous utterances versus pre-programmed utterances (sentences that are stored ahead of time and then selected during conversation). Consequently, LAM can be used to create a language transcript for analysis and reporting of performance using VSLD and the transition progress into the Unity® Minspeak Application Program (MAP™) regarding both polysemous symbols and Pixons.

LAM offers unique information on the use of visual scene language displays (VSLD), because the format of the time stamp (24 hour clock) with the LRM mnemonic followed by the individual event. Therefore, the LAM feature can be used to monitor learning and report performance. In at least one embodiment of the present application, the following information can be gathered on VSLD use based on the unique LAM format:

1. Frequency of use: The time of day and amount of events the VSLD's were used. Time stamps can be matched with training session and environmental activities and comparisons made for frequency of use.
2. Vocabulary analysis: The language transcript based on LAM data can be analyzed to report the following performance measures related to vocabulary:
    a. Percent of core vocabulary accessed using VSLD.
    b. Frequency listing of vocabulary accessed using VSLD.
    c. Alphabetic listing of vocabulary accessed using VSLD.
    d. Listing of vocabulary by LRM accessed using VSLD.
3. Icon sequences: LAM based language transcripts will allow for the reporting of the icon sequences used in the Unity® Minspeak Application Program (MAP™), but accessed using VSLD.
4. Monitor the use of icons to represent language structures: LAM based language transcripts will allow for the reporting of the following VSLD architectural paradigms used in the Unity® Minspeak Application Program (MAP™).
    a. Pronoun auxiliary combinations
    b. Indefinite paradigm
    c. Noun categories
    d. Verb forms
5. Pixons: LAM based language transcripts will allow for the reporting of the Pixons used in teaching the entry levels for the Unity® Minspeak Application Program (MAP™), but accessed using VSLD.

Thus, using LAM, a method can be developed for monitoring usage in conjunction with VSDs. In one embodiment, the method includes displaying a scene relating a selected polysemous symbol to at least one of a word, phrase, and message, accessible via a selectable symbol sequence including the selected polysemous symbol; and monitoring usage of polysemous symbols and the displayed scene. In another embodiment, the method includes displaying a scene, including a compilation symbol related to plurality of symbols in a sequence of symbols usable to access at least one of a word, phrase and message, the displayed scene relating a selected compilation symbol to the accessible at least one of a word, phrase, and message; and monitoring usage of at least two of compilation symbols, polysemous symbols and displayed scenes.

Further, using LAM, a device can be developed in at least one other embodiment, for monitoring usage in conjunction with VSDs. In one embodiment, the device 8 includes a display 7 to display a scene relating a selected polysemous symbol to at least one of a word, phrase, and message, accessible via a selectable symbol sequence including the selected polysemous symbol; and a processor 4 to monitor usage of polysemous symbols and the displayed scene. In another embodiment, the device 8 includes a display 7 to display a scene, including a compilation symbol related to plurality of symbols in a sequence of symbols usable to access at least one of a word, phrase and message, the displayed scene relating a selected compilation symbol to the accessible at least one of a word, phrase, and message; and a processor 4 to monitor usage of at least two of compilation symbols, polysemous symbols and displayed scenes. In either embodiment, the device may also include at least one of a virtual and hardwired keyboard.

Icon Prediction on a Schematic Display Using Minspeak®:

In at least one embodiment, the aspects of current icon prediction features, such as those disclosed in any of the Baker '425, '041 and '303 patents discussed above and incorporated herein for example, can be combined with schematic or whole/part screen photographic/graphic VSD display technology. A schematic VSD may include icons embedded in the image. When the first icon is selected in the VSD, icons from possible icon sequences are predicted/determined based on the other icons used within the schematic display. The possible next icons in possible icon sequences can remain highlighted or otherwise distinguished, while the other icons in the schematic are non-distinguished or shaded for example.

Predictive Selection on a Schematic Display Using Minspeak®:

In at least one embodiment, using the overlay display including a VSD described above, once an icon is selected, as discussed in any of the Baker '425, '041 and '303 patents discussed above and incorporated herein for example, only icons that can be selected to complete the sequence can be selected.

Camouflaging or Fixed Prediction:

In at least one embodiment, based on use of schematic or whole screen photographic/graphic display technology of a VSD, a scheme or theme, such as a playground or bedroom overlay image, may be placed on top of a Minspeak® (grid screen of polysemous and other icons) display. The images used to represent vocabulary may be located on the schematic display in the same location on the screen as the Minspeak® icons. Once vocabulary has been "learned" and motor planning has been "established", the schematic VSD screen may be removed, revealing the Minspeak® overlay (virtually or physically). Consequently, the schematic screen was camouflaging the Minspeak® overlay.

Fitts' Distance Prediction (FDP):

In at least one embodiment, based on the principle of Fitts' Law that the time required to move from a home position to a second position is a function of the distance (Jagacinski & Monk, 1985), FDP may use the display technology of VSDs to reduce the distance from the home position to a target. FDP works when a home position (Minspeak® icon or other symbol/key) is selected and the display technology is used to predict the next most likely target by moving the position a closer distance to the home position when the scene changes. FDP can be used to take advantage of the most frequently used collocations in Minspeak®.

Fitts' Target Prediction (FTP):

In at least one embodiment, based on the principle of Fitts' Law that performance in selecting a target is influenced by the size of the target (Jagacinski & Monk, 1985), FTP may use display technology of VSDs to enlarge the target size of a second or third icon in an icon sequence. Once the home position icon is selected the scene automatically enlarges the target size area of second possible icons in a sequence on the schematic display. The feature provides for variable enlargement sizes for targets based on percent of screen. In addition, the field boundary for the target is automatically indicated on the display.

Monitor the Learning:

LAM based language transcripts will allow for the reporting of learning to use VSLDs and learning to transition into sequencing icons for the Unity® Minspeak Application Program (MAP™). Using the LAM format, examples of performance measures that can be reported to document learning include: mean length of utterance in words (MLU-w); mean length of utterance in morphemes (MLU-m), number of different word roots, total number of words or icons, frequency of spontaneous utterances, frequency of pre-programmed utterances. LAM may be used to identify when camouflaging, FDP and/or FTP are being used.

Icon Prediction on a Visual Scene Display (VSD) Using Minspeak®:

This notion in at least one embodiment, is based on the current icon prediction feature of the '425, '041, and '303 Baker patents discussed above, but uses whole/part screen photographic/graphic VSD display technology. A VSD may include icons and/or other linguistically significant hotspots embedded in the image. When the first icon of the keyboard is selected, the feature predicts the possible icon sequences based on the other icons used within the VSD. The icons which possibly complete icon sequences remain highlighted, while the other icons in the VSD are shaded. None of the current systems use sequenced polysemous symbols and hotspots. Polysemous, sequenced icons or hotspots embedded or partially embedded in a VSD can be used, for example, for language generation, device training, games, etc.

Predictive Selection on a VSD Using Minspeak®:

In at least one embodiment, using the overlay keyboard displays (including VSDs) described above, once an icon or hotspot is selected, only icons or hotspots that can complete an icon sequence can be selected (in combination with the prediction technology of the '425, '041, and '303 Baker patents discussed above, for example). None of the current systems do this—none of them use sequencing. Mixing a grid and a graphic has not been foreseen in any of the current VSD proposals.

Masking or Fixed Prediction:

In at least one embodiment, this concept is based on the use of a VSD or whole screen photographic/graphic display technology electronically overlaying a more traditional Minspeak® grid. A theme or environment VSD, such as a playground or bedroom overlay image, may be placed on top of a Minspeak® (grid screen) display (over a virtual keyboard Minspeak® display). The images used to represent vocabulary may then be located on the VSD display in the same location on the screen as the Minspeak® icons. Once vocabulary has been "learned" and motor planning has been "established" the VSD is removed (or virtually fades), revealing the Minspeak® (e.g. Unity®) overlay (a virtual keyboard Minspeak®/Unity® display). Having a VSD masking any other kind of overlay has not been envisioned by the current technology. Having sequenced polysemous symbols or hotspots on a VSD has not been envisioned by current technology. Combining both ideas is novel, non-obvious, and useful.

Fitts' Distance Prediction (FDP):

In at least one embodiment, this concept is based on the principle of Fitts' Law that the time required to move from a home position to a second position is a function of the distance (Jagacinski & Monk, 1985). FDP uses dynamic display technology to reduce the distance from the home position to the target. FDP works when a home position (Minspeak® icon, other symbol/key, or hotspot) is selected and the display technology is used to predict the next most likely target by moving the position a closer distance to the home position when the scene changes. FDP can be used to take advantage of the most frequently used sequences in Minspeak® brand software.

Fitts' Target Prediction (FTP):

In at least one embodiment, this concept is based on another principle of Fitts' Law that performance in selecting a target is influenced by the size of the target (Jagacinski & Monk, 1985). FTP uses dynamic display technology to enlarge the target size of a second or third icon in an icon sequence. Once the home position icon is selected the screen automatically enlarges the target size area of second possible icons in a sequence on a grid, VSD, or orthographic display. The icons or pictorial segments may remain the same size within the enlarged target (selectable) space, or they may also enlarge to fill the enlarged target space. The feature provides for variable enlargement sizes for targets based on percent of screen. In addition, the field boundary for the target is automatically indicated on the display.

These features depend upon the use of sequences and so are not used in any of the other current technology. The formal reliance on Fitt's Law in AAC may be novel. The use of polysemy in these contexts is certainly novel. In fact, the concept of dynamically re-sized or re-positioned icons based on input may itself be novel in AAC.

Panoramic Screen Scrolling Technology for Motor Planning and Entertainment:

In at least one embodiment, a VSD showing a scene (e.g. the Golden Gate Bridge) which can be scrolled to the left, right, up or down, can be used to show an entire panorama made up of one or more pictures. This could have two distinct featural advantages: 1) the ability to use a very large pictorial scene with a lot of contextual value without worrying about space limitations, and 2) the ability to manipulate (scroll) the VSD by using icon sequences (e.g., the sequence for 'up' scrolls the picture up). Furthermore, the VSD panorama could also include spliced or altered versions of the main picture to allow additional vocabulary to be placed in exactly the same context (e.g., the sun and moon could coexist in different parts of the same panorama, one showing the Golden Gate during the day and one showing it at night). This would allow the user or teacher to return to same picture for many different lessons, while maintaining a familiar context and promoting a good orientation.

Flash® Movies as VSDs to teach the meaning of icons and icon sequences: In at least one embodiment, this concept can be used to teach all the important metaphors associated with the Minspeak® core vocabulary icons. Several Flash movies could be used for each icon to teach the salient metaphors. (E.g., show a train coming together to illustrate the conjunction icon & concept as will be explained hereafter; sand moving in Father Time icon, etc). With Flash, these movies can also be highly interactive (e.g. user can pour the sand from the hourglass, or push the train cars together). Each movie (or several movies at once) can be integrated with all or part of a 128/84 location Unity® overlay.

Icon Stories Outline (Use of VSDs to Teach Language of Polysemous Symbol Sequences of Minspeak®/Unity®)

One aspect of an embodiment of this patent application is to use visual scene displays (VSDs) to teach a potential user of the system (who many times is cognitively impaired in some way, for example) the standard icons (and Pixons) in terms of the icon sequences that they are used in, how they relate differentially to each other, why and how they link together, etc. The teaching tasks may include, but are not limited to:

16) The primary meaning and label of the polysemous icon or composite symbol used to introduce a later polysemous use of the symbol or elements of the symbol
17) The position of the icon in relationship to other icons
18) The attributes and categories suggested by the icon
19) The vocabulary represented by the icons
20) The grammatical relationships between and among icons
21) The semantic, ontological, taxonomic networks of the icons and their arrays
22) The rules underlying Unity®'s infrastructure
23) The color patterns of the icons
24) The relationship of semantic icons to grammatical icons
25) The phrase structures using pronouns and verbs
26) The structures and access of phrasal verbs
27) The use of icon prediction in Unity®
28) The use of activity rows in Unity®
29) The use of pop-ups for literate facilitators in teaching Unity®
30) Access strategies for obtaining variations for different parts of speech—tense, comparisons, plurality, case, etc.

VSD Technology to Teach Icon Sequences:

In at least one embodiment, a VSD picture (such as one of the farm, for example) can be used to teach the various prepositional concepts based on one metaphor. This metaphor can then be used to teach an icon sequence (in a manner somewhat similar to the expressed above). An example is as follows regarding FIG. 3 of the present application.

In at least one embodiment, a fireworks graphic on a VSD, similar to the Unity® icon, could be used to teach the Unity® metaphor about interjections and the icon sequences involving interjections. For example, in the keyboard screen 207 of FIG. 3, the fireworks symbol 330 may be shown as illustrated in row 2, column 4 (noting that the inclusion of the interjection "please" on the key may or may not be present and thus embodiments of the present invention need not be limited to keys including words thereon. In fact, as the keys are mainly polysemous and therefore correspond to multiple words when sequenced together, it may be preferable, in each of the embodiments of the present application, to omit the use of words on the keys). From the simple example standpoint of associating the word "please" with the fireworks key, interjections can thus be associated with this key as the "fireworks" key is the signal key (the first key in a symbol sequence) for icon sequences used to access interjections. Thereafter, one can use the VSD to teach the polysemy of the key and thus get others to understand that all sequences for accessing interjections need to include the fireworks key as a signal or category key.

This could occur as follows:
INTERJECTION
Virtual keyboard page 1 (hereafter "page" refers to a virtual keyboard page or to an image displayed in conjunction with or in place of a virtual keyboard)—once the fireworks icon is selected, it may or may not change size (e.g. to create a large INTERJECTION icon)—thereafter, the device may output a phrase using the interjection "please" such as "please, let's go see the fireworks."
page 2—movie clip of fireworks (noting that all such clips may be played on the entire screen or in a part of the screen, so as to display both the scene and the icon for example . . . noting that the scene can further include the icon placed therein).
page 3—kid in the picture says, "cool, awesome" —use icon AWESOME
page 4—large INTERJECTION icon—"Interjections are words that pop up in conversations just like fireworks." Button at the left bottom corner has interjection icon on it—sound "please. Please do it again" pages repeat.

Somewhat similarly, a graphic or animation of a wizard pointing (see keyboard above, row 2, column 5) could teach the Unity® metaphor about determiners in at least one embodiment. This will be described with regard to FIG. 1A-10C for example.

Figure 10A:
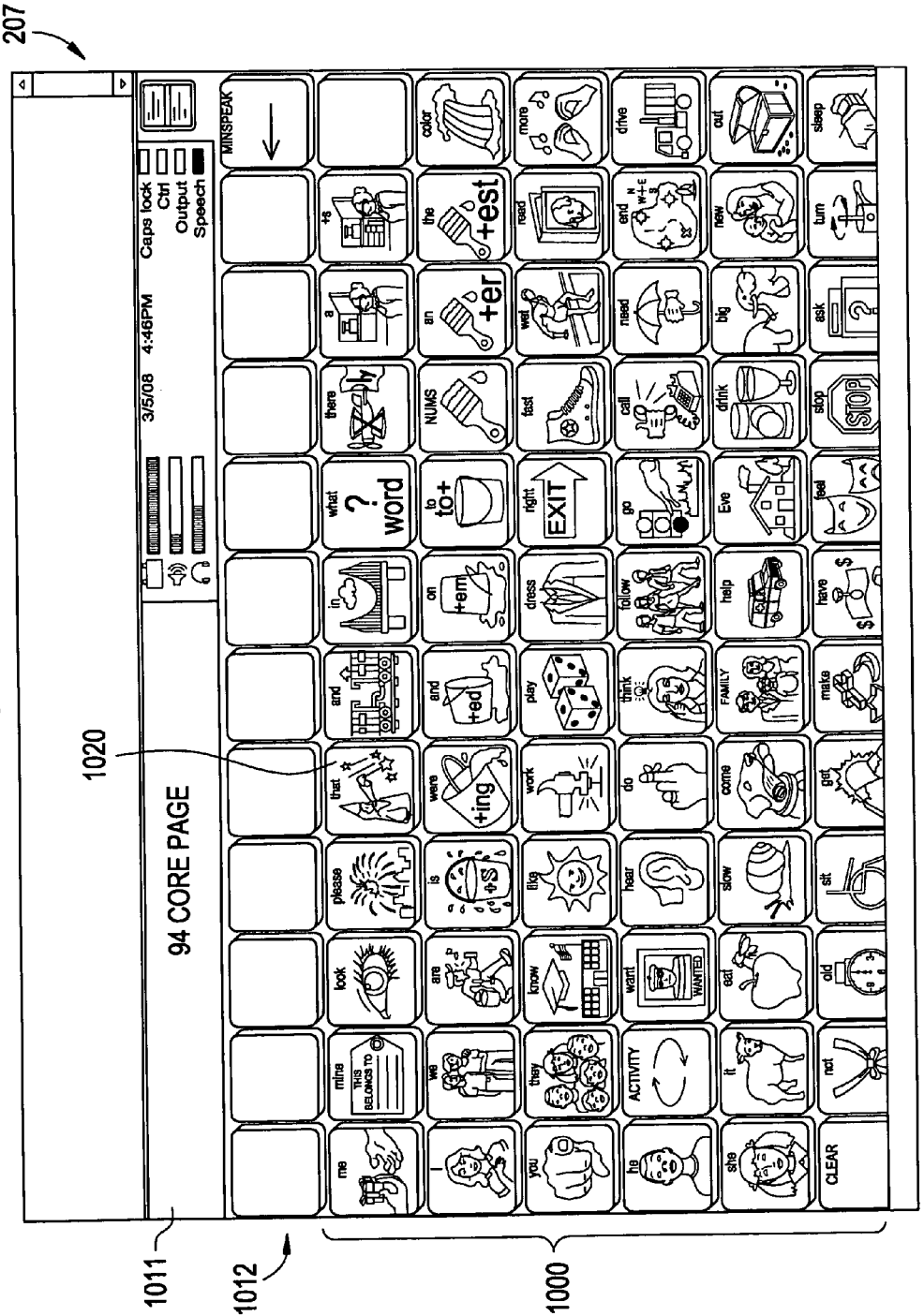
FIGS. 10A-C illustrate modified versions of an integrated keyboard and display, with FIGS. 10B and 10C including an integrated keyboard and display including a VSD in at least a portion thereof.

FIG. 10A illustrates an example embodiment, including an example integrated keyboard/display 207 illustrating an example version of a standard polysemous symbol vocabulary. The integrated keyboard/display 207 includes an activity row of keys 1012, a display area 1011 and a keyboard area 1000, acting similar to those described previously. By selecting one of the determiner keys such as the "that" key 1020, at least a portion of the keyboard area 1000, in at least one embodiment, converts to a VSD 1002 of FIG. 10B displaying the wizard icon of key 1020. As such, the determiner icon selected (the "wizard" of key 1020 in the present example) then is displayed in a large portion of the keyboard 1000, in the VSD area 1002. Optionally, the word "that" is then audibly output.

Figure 10B:
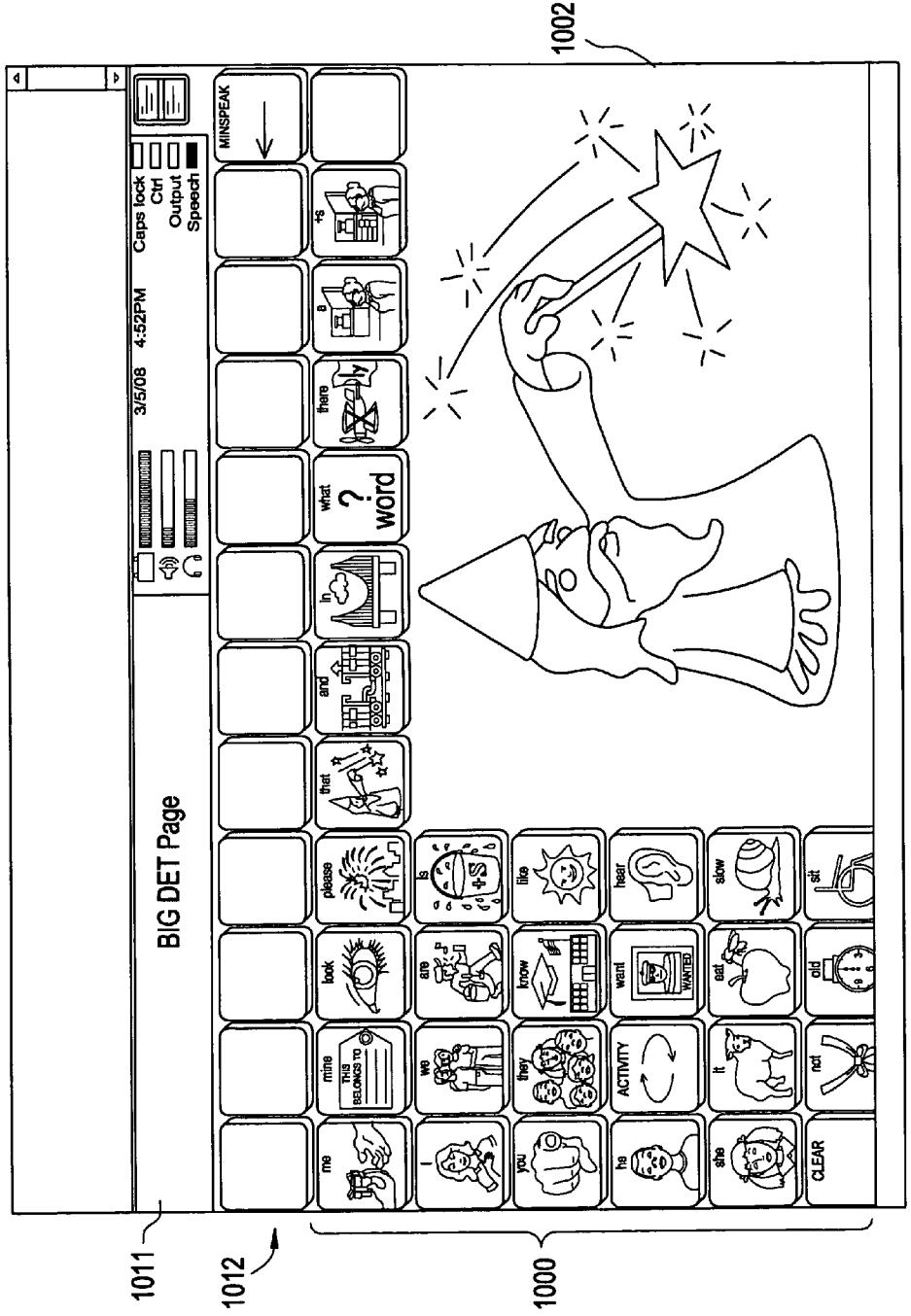
Figure 10C:
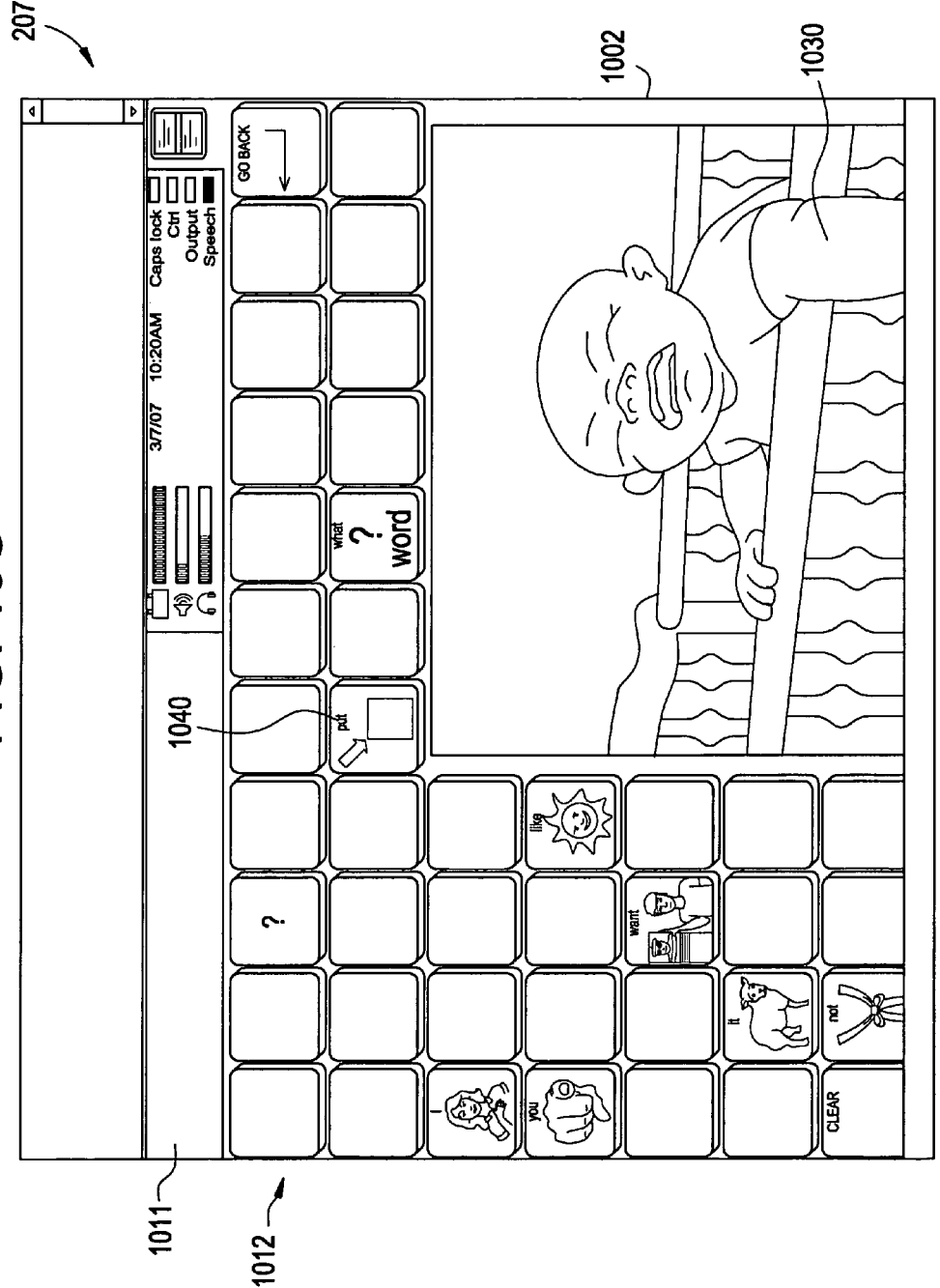

Thereafter, as shown in FIG. 10C, the VSD 1002 may display a scene including, for example, including various "hot spots" and including a baby 1030 pointing to a toy across the room (not shown). When one touches the "hot spot" of the baby 1030 for example, a baby voice may be audibly output saying "that" or "that, I want that." Thereafter, the display may revert to the VSD 1002 of FIG. 10B showing Mr. Wizard, and/or an audible output can say, in a different voice, "Mr. Wizard, the determiner points to that."

Further, as shown by element 1040, a Pixon for "that" may also be displayed as part of the keyboard in which the VSD 1002 is embedded, upon appearance of the baby 1030 in the VSD 1002 for example. Thus, polysemous symbols such as the wizard 1020 of FIG. 10A, Pixons such as the "that" Pixon 1040 of FIG. 10C, and VSDs 1002 of FIGS. 10B and 10C can be mixed and matched at various times on the integrated input and display 207.

This is summarized as follows:

DETERMINER
- page 1—Determiner icon fills most of the page (optional), when you touch it or click on it, you hear the word "That" and the page changes to page 2
- page 2—photo of a baby pointing to a toy across the room. When you touch it or click on it anywhere you hear a baby voice say "that, I want that."
- page 3—Determiner icon—voice over says "Mr. Wizard, the determiner points to that."

In at least one embodiment, the wizard graphic could be large and animated. It could fade to a smaller wizard graphic pointing to various other determiner icons (For example, the Wizard is the signal icon, or first icon in a sequence, for all determiners. Thus the sequence of wizard+wizard=the determiner "that"; and the sequence of wizard+another icon=the determiner "this", wizard+another icon=the determiner "these", etc.). This could be combined with voice output. The wizard could point to the various determiner icons when those icons are selected and speak the determiners. As such, the VSD can be used in combination with polysemous symbols to teach signal icons and icon sequences.

Finally, a train coupling, similar to the Unity® conjunction graphic, could be used to teach the Unity® metaphor about conjunctions.

CONJUNCTION
- Page 1—Large CONJUNCTION icon, when you touch it or click on it you hear the word "and"—goes automatically to page 2
- page 2—two train cars are apart on the track, when you touch them they move closer until they join. As they link together you hear a voice over "and, I want this and that."
- page 3—large CONJUNCTION icon with a button, button has voice over with rationale: "conjunctions are words that join other words together"

In at least one embodiment, in learning prepositions, the preposition key (the golden gate bridge in row 2, column 7 above) may appear in the upper position (approximately where it would be on the Unity overlay).

PREPOSITON
- page 1—large PREPOSITION icon, when you touch it or click on it, you hear the word "in" page 2 appears
- page 2—"There is something in the water"—you see a picture of a bridge with (a troll for example) in the water under the bridge. When you touch the object, page 3 appears.
- page 3—"Let's go across the bridge"—picture of someone or something (like the billy goat for example)—when you touch it, it walks across a bridge page 3 appears
- page 4—"Let's go under the bridge"—picture of a person or goat, when you touch it, it goes under a bridge. page 4 appears
- page 5—large PREPOSITION icon, button underneath has voice over with the rationale: "The bridge, or preposition icon, shows position."

For verbs, in at least one embodiment, there may be three signal keys similarly colored (green as shown above). These can include the three keys in the third row, in the third, fourth, and fifth columns. For example, the VERB signal key may be "Mr. Action Man", the VERB+S signal key may be Mr. Action Man's bucket of water, and the VERB+ING signal key may be Mr. Action Man's bucket of water with water pouring out. Thus, the VSDs can be used not only to teach signal icons and sequences, but also to relate related signal icons to one another. As such, the VSD can be used in combination with polysemous symbols to teach signal icons and other related signal icons, as well as icon sequences.

VERB
- page 1—large VERB icon, when you touch it you hear "Mr. Action Man"—page 2 opens
- page 2—photo of Bob the Builder with a hammer and a bucket, when you touch the hammer you hear sounds of hammering, when you touch the bucket you hear water sloshing, when you touch Bob's face you hear whistling. page 3 opens when you touch his feet
- page 3—VERB icon—button below—voice over says "What ARE you doing, Mr. Action Man?"

VERB+S
- page 1 large VERB+S icon—"IS"
- page 2—picture of Mr. Action man holding the s bucket of water with water drops splashing out—sound of water splashing
- page 3—large VERB+S icon "There is water in the bucket."

VERB+ING
- page 1—large VERB+ING icon "were"
- page 2—picture of Mr. Action Man and a kid pouring water out of a bucket "We were pouring water out." sound of pouring water
- page 3—large VERB+ING icon—"were"

As such, a method of at least one embodiment may be provided for combining VSDs and Minspeak/Unity polysemous symbol sequences. Such a method can include receiving an indication of selection of a key from a keyboard (via processor 4 for example), including a polysemous symbol (such as key 1020 for example); and displaying a scene (such as 1002 for FIG. 10B and/or FIG. 10C for example) related to the selected polysemous symbol. The displayed scene may include the selected polysemous symbol (such as the wizard of FIG. 10B for example). Further, the displayed scene may relate the selected polysemous symbol to at least one of a word, phrase, and message, accessible via a selectable symbol sequence including the selected polysemous symbol. The keyboard can be virtual, hard-wired or both. Further, the displaying can include displaying a scene relating the selected polysemous symbol to a related group of at least one of words, phrases, and messages, each accessible via a selectable symbol sequence including the selected polysemous symbol. Still further, the group of selectable symbol sequences may be of a common part of speech. In addition, an audible output can be provided, relating the selected polysemous symbol to at least one of a word, phrase, and message, accessible via a selectable symbol sequence including the selected polysemous symbol.

Alternatively, a method of at least one embodiment can include receiving an indication of selection of a key from a keyboard (via processor 4 for example), including a polysemous symbol (such as key 1020 for example); and displaying a scene (such as 1002 for FIG. 10B and/or FIG. 10C for example) relating at least one of an accessible word, phrase or message (the "that" for example") to the polysemous symbol (the wizard for example) of the selected key. Further, the selected polysemous symbol may be a first symbol for a group of selectable symbol sequences, and the group of selectable symbol sequences may be of a common part of speech. In addition, an audible output can be provided, relating the selected polysemous symbol to at least one of a word, phrase, and message, accessible via the selected polysemous symbol.

Alternatively, a method of at least one other embodiment may be provided for combining VSDs and Minspeak/Unity polysemous symbol sequences. The method may include receiving an indication of selection of a key from a keyboard (via processor 4 for example), including a polysemous symbol; and displaying a scene relating the selected polysemous symbol to a group of selectable symbol sequences including the selected polysemous symbol. The keyboard may be hard-wired, virtual or both. The selected polysemous symbol may be a first symbol for a group of selectable symbol sequences, and the group of selectable symbol sequences may be of a common part of speech. Further, an audible output may be provided, relating the selected polysemous symbol to a group of selectable symbol sequences including the selected polysemous symbol.

Alternatively, a method of at least one other embodiment may be provided for combining VSDs and Minspeak/Unity polysemous symbol sequences. The method may include receiving an indication of selection of a key from a keyboard displayed on a display (via processor 4 for example), including a polysemous symbol; and displaying a scene, on at least a portion of the display, relating the selected polysemous symbol to a category of selectable symbol sequences including the selected polysemous symbol as a first symbol. The group of selectable symbol sequences may be usable to access at least one of a word, phrase, and message of common parts of speech. Further, the scene may be displayed in place of the virtual keyboard and/or the scene may be displayed concurrent with the virtual keyboard. Additionally, a hard-wired keyboard for entry of the polysemous symbols may be provided. Further, an audible output may be provided, relating the selected polysemous symbol to a category of selectable symbol sequences including the selected polysemous symbol as a first symbol.

Alternatively, a method of at least one other embodiment may be provided for combining VSDs and Minspeak/unity polysemous symbol sequences. The method may include receiving an indication of selection of a key from a keyboard (via processor 4 for example), including a plurality of symbols which, when sequenced together, are usable to access at least one of a word, phrase and message; and displaying a scene, including the selected key, relating the selected plurality of symbols to the accessible at least one of a word, phrase, and message. The scene may be displayed in place of the keyboard and/or the scene may be displayed concurrent with the keyboard. Additionally, a hard-wired keyboard for entry of the polysemous symbols may be provided. Further, an audible output may be provided, relating the selected plurality of symbols to the accessible at least one of a word, phrase, and message.

In addition, for each such method, a device 8 may be provided. Such a method can include receiving an indication of selection of a key symbol (such as key 1020 for example) from a keyboard (via processor 4 for example), including a polysemous symbol (such as key 1020 for example); and displaying a scene (such as 1002 for FIG. 10B and/or FIG. 10C for example) related to the selected polysemous symbol. The displayed scene may include the selected polysemous symbol (such as the wizard of FIG. 10B for example). Further, the displayed scene may relate the selected polysemous symbol to at least one of a word, phrase, and message, accessible via a selectable symbol sequence including the selected polysemous symbol. The keyboard can be virtual, hard-wired or both. Further, the displaying can include displaying a scene relating the selected polysemous symbol to a related group of at least one of words, phrases, and messages, each accessible via a selectable symbol sequence including the selected polysemous symbol. Still further, the group of selectable symbol sequences may be of a common part of speech. In addition, an audible output can be provided, relating the selected polysemous symbol to at least one of a word, phrase, and message, accessible via a selectable symbol sequence including the selected polysemous symbol.

In addition, for each such method, a device 8 may be provided. The device 8 may include a display 7 to display, on at least a portion thereof, a virtual keyboard 207 including a plurality of keys 300 including polysemous symbols, the display 7 further being used to display, on at least a portion thereof and in response to selection of a virtual key including a polysemous symbol, a scene 302 related to the selected polysemous symbol. The device 8 can further include an audible output device 10/14 to provide an audible output relating the selected polysemous symbol to a category of selectable symbol sequences including the selected polysemous symbol as a first symbol. Additionally, a hard-wired keyboard for entry of the polysemous symbols, may be provided In another embodiment, the device 8 may include a display 7 to display, on at least a portion thereof, a virtual keyboard 207 including a plurality of keys 300 including polysemous symbols, the display 7 further being used to display, on at least a portion thereof and in response to selection of a virtual key including a polysemous symbol, a scene 302 relating the selected polysemous symbol to at least one of a word, phrase, and message, accessible via a selectable symbol sequence including the selected polysemous symbol. Additionally, a hard-wired keyboard for entry of the polysemous symbols may be provided. Further, an audible output device 10/14 may be provided to provide an audible output relating the selected polysemous symbol to at least one of a word, phrase, and message, accessible via a selectable symbol sequence including the selected polysemous symbol.

Non-limiting examples of the use of VSDs to teach signal icons and language of polysemous symbol sequences of Minspeak®/Unity® are as follows:

2. INTERJECTION
- page 1—large INTERJECTION icon—"please, let's go see the fireworks."
- page 2—movie clip of fireworks
- page 3—kid in the picture says, "cool, awesome" —use icon AWESOME
- page 4—large INTERJECTION icon—"Interjections are words that pop up in conversations just like fireworks."

Button at the left bottom corner has interjection icon on it—sound "please. Please do it again" pages repeat.

3. DETERMINER page 1—Determiner icon fills most of the page, when you touch it or click on it, you hear the word "That" and the page changes to page 2 page 2—photo of a baby-pointing to a toy across the room. when you touch it or click on it anywhere you hear a baby voice say "that, I want that."

page 3—Determiner icon—voice over says "Mr. Wizard, the determiner points to that."

4. CONJUNCTION

Page 1—Large CONJUNCTION icon, when you touch it or click on it you hear the word "and" —goes automatically to page 2 page 2—two train cars are apart on the track, when you touch them they move closer until they join. As they link together you hear a voice over "and, I want this and that."

page 3—large CONJUNCTION icon with a button, button has voice over with rationale: "conjunctions are words that join other words together"

5. PREPOSITON page 1—large PREPOSITION icon, when you touch it or click on it, you hear the word "in" page 2 appears page 2—"There is something in the water" —you see a picture of a bridge with (a troll for example) in the water under the bridge. When you touch the object, page 3 appears.

page 3—"Let's go across the bridge" —picture of someone or something (like the billy goat for example)—when you touch it, it walks across a bridge page 3 appears page 4—"Let's go under the bridge" —picture of a person or goat, when you touch it, it goes under a bridge. page 4 appears page 5—large PREPOSITION icon, button underneath has voice over with the rationale: "The bridge, or preposition icon, shows position."

6. QUESTION WORD page 1—large QUESTION WORD icon, when you touch it or click on it, you year the word "what" page turns to page 2 page 2—baby face (or kitten pix) looking quizzical—voice over says "What? What is that?" when you touch it, page 3 appears page 3—large QUESTION WORD icon, button with rationale voice over: "QUESTION WORD begins words like what, who, when, and where."

7. ADVERB page 1—large ADVERB icon, when you touch it you hear airplane sound, page turns to page 2 page 2—airplane moves across sky background, voice over says "There, there it goes!" Touch page and page 3 appears page 3—large ADVERB icon, with button below. The button has voice over with rationale: "Adverbs tell where, when, or how."

8. OBJECTIVE page 1—large OBJECTIVE icon, when you touch it you hear "Me" —page 2 appears page 2—photo of child reaching for a present in another person's hand—voice over "Me, give it to me." touch the present and page 3 appears page 3—OBJECTIVE icon, button below—voice over "Give the present to me."

9. POSSESSIVE page 1—large POSSESSIVE icon, when you touch it you hear "Mine" —page 2 opens page 2—baby hugging a large stuffed toy, toy has a name tag on a ribbon. Name tag has MINE written on it. when you touch the baby, it says "mine" in a baby voice. page 3 opens page 3—POSSESSIVE icon—voice over says "mine, this belongs to me. it's mine."

10. VERB page 1—large VERB icon, when you touch it you hear "Mr. Action Man" —page 2 opens page 2—photo of Bob the Builder with a hammer and a bucket, when you touch the hammer you hear sounds of hammering, when you touch the bucket you hear water sloshing, when you touch Bob's face you hear whistling. page 3 opens when you touch his feet page 3—VERB icon—button below—voice over says "What ARE you doing, Mr. Action Man?"

11. VERB+S page 1 large VERB+S icon—"IS"

page 2—picture of Mr. Action man holding the s bucket of water with water drops splashing out—sound of water splashing page 3—large VERB+S icon "There is water in the bucket."

12. VERB+ING page 1—large VERB+ING icon "were"

page 2—picture of Mr. Action Man and a kid pouring water out of a bucket "We were pouring water out." sound of pouring water page 3—large VERB+ING icon—"were"

13. VERB+ED page 1—large VERB+ED icon—"was"

page 2—picture of Mr. Action man looking at a bucket tipped over on the ground, a puddle in front. "There was water in the bucket."

page 3—large VERB+ED icon—"was"

14. VERB+EN page 1—large VERB+EN bucket—"on"

page 2—Mr. Action Man is standing on the bucket.

page 3—large VERB+EN bucket "on"

15. VERB+TO page 1—large VERB+TO bucket—"to"

page 2—Mr. Action Man is holding the to bucket out to a kid. When you touch the kid, you hear, "I want to get some water."

page 3—the kid has Mr. Action Man's bucket.

page 4—large VERB+TO icon—"to"

16. ADJECTIVE page 1—large ADJECTIVE icon page 2—picture of a painter painting a picture on a wall with a large adj paintbrush. The items he has already painted will say describing words when you touch them, like pretty, ugly, blue, yellow page 3—large ADJ icon "An adjective describes something."

17. ADJECTIVE+ER page 1—large ADJ+ER icon—"an"

page 2—picture of same painter, now he is painting an apple on the wall. "He's painting an apple.

page 3—large ADJ+ER icon—"an"

18. ADJECTIVE+EST page 1—large ADJ+EST icon "the"

page 2—picture of athletes on podiums, winner, runner up, and second runner up, like the Olympics. The winner has the ADJ+EST icon on her stand. "She's the best!"

page 3—large ADJ+EST icon—THE

19. NOUN page 1—large NOUN icon—"a"

page 2—color picture of Mother Hubbard at her cupboard. When you touch her, you hear, Mother Hubbard is a person. When you touch the cupboard you hear, "Her cupboard is a place." When you touch the jar in the cupboard you hear, "There is a thing in the cupboard."

page 3—large NOUN icon—"A noun is a person, place, or thing."

20. NOUN PLURAL page 1—large NOUN PLURAL icon—"The noun plural key adds an "s"

page 2—color picture of NOUN PLURAL icon—Touch Mother Hubbard and you hear, "Mother Hubbard is a person." touch the cupboard and you hear, "her cupboard is a place." Touch the things and you hear "There are things in the cupboard."

21. I page 1—large I icon "I"

page 2—photo of a girl. When you touch the girl, you hear "I am Jane." (this one is for people to customize on their own by putting in a photo of the person who is using the device, and customizing the saying.)

page 3—large I icon "I"

22. WE page 1—large WE icon "we"

page 2—picture of two kids "We are best friends."

page 3—two or three kids in each picture doing different things. "We ride." (picture of kids in a blue truck)

page 4—We eat (picture of kids eating apples).

page 5—"We read (picture of kids reading a book)

page 6—We walk (picture of kids walking, they have blue tennis shoes on their feet)

page 7—"we drink (picture of kids drinking juice)

page 8—large WE icon "we"

23. KNOW page 1—large KNOW icon "know"

page 2—picture of a school, touch the door and page 3 opens page 3—picture of a classroom with several children. One kid has his hand raised. When you touch the kid, you hear "I know, I know."

page 4—large KNOW icon "It's good to know the answer in school."

24. SUN page 1—large SUN icon, when you touch it he says "like, I like to laugh." page 2 opens page 2—photo of baby laughing. When you touch the baby's face you hear baby laugh sound. page 3 opens page 3—SUN icon with a button below, voice over says "Everybody likes a sunny day. page 4 opens page 4—beach scene with SUN icon in the sky. Boy swimming, when you touch him, text reads "I like swimming." Girl reading a book in the shade, when you touch her text reads "I like reading." Girl eating ice cream cone, when you touch her text reads "I like eating ice cream." when you touch the SUN icon in the sky, text reads "Everybody likes a sunny day.

25. HAMMER page 1—large HAMMER icon, when you touch it, you hear the word "work" page 2 opens page 2—photo of a person with a hammer, when you touch the hammer, you hear the sound of hammering, page 3 page 3—photo of carpenters building a house, when you touch it, voice over says, "work, watch them work." —movie clip of carpenters working?

page 4—HAMMER icon, button below, when you touch it, voice over says the icon rationale: "you can work with a hammer."

26. SCALES page 1—large SCALES icon, when you touch it, you hear the word "fat" and page 2 opens page 2—picture of scales in a butcher shop—old fashioned picture with meat on the scale. When you touch the scale you hear, "Fat, the meat is fat. page 3 opens page 3—SCALES icon with button below—voice over says "You weigh things on the SCALES."

27. SUIT page 1—large SUIT icon, when you touch it, you hear the word "clothing" page 2 opens page 2—picture of a room with clothes on everything, bed, floor, chairs, etc. Each piece you touch says the name of the clothing item. there is a SUIT hanging on a hook on the wall, when you touch it, text reads, "pick up your clothes!" page turns to page 3

SUIT icon with button below—voice over says "A suit is clothing."

28. FLOWERS page 1—large FLOWERS icon, when you touch it you hear the word "give" and page 2 opens page 2—picture of two people and a lei. One person is putting the lei on the other person. (Hawaiian music sound). When you touch the lei, page 3 opens.

page 3—FLOWERS icon—voice over says, "it is nice to give flowers."

29. EXIT page 1—large EXIT icon—"right" —page 2 opens page 2—"the EXIT sign is pointing right."

30. SHOE page 1—large SHOE icon—"walk" —page 2 opens page 2—person walking page 3—"The SHOE icon means things you do with your feet page 4—and sports—icon sequences for a few types of sports (buttons that speak the name of the sport when you touch the button)

page 5—a sports scene (sound of crown cheering)

31. BOY page 1—large BOY icon—"wet"

page 2—photo of a pool with a boy going into the water "Now the boy is going into the pool. Will he get wet?" (sound of children and water splashing)

page 3—wet boy picture "This BOY is wet"

32. BOOK page 1—large BOOK icon—"read"

page 2—photo of a person reading a book page 3—icon for READ—"you can read a BOOK."

page 4—photo of an adult reading a book to a child— "Read it again." when you touch the book, goes back to page 1

33. MORE page 1—large MORE icon—"more"

page 2—person listening to music and signing more, page 3—person with an empty juice glass signing more page 4—person with an empty bowl signing more page 5—child playing on the floor with another person— child signs more page 6—MORE icon—"Most people want to hear MORE MUSIC"

34. CACTUS page 1—large CACTUS icon—"dry"

page 2—photo of a cactus in the desert—"the desert is dry"

35. DICE page 1—large DICE icon—"play"

page 2—picture of children playing a board game with dice. When you touch the dice, page 3 opens page 3—DICE icon in the center with pictures of games surrounding page 4—DICE icon "You can play games with dice."

36. PHONE page 1—large PHONE icon "say"

page 2—picture of a person talking on the phone page 3—PHONE icon—sound of phone ring "say Hello" when you answer the phone

37. THINK page 1—large THINK icon "think"

page 2—picture of two people talking page 3—"Tell me what you think."

38. MOUNTAINS page 1—large MOUNTAINS icon page 2—photo of people skiing in the mountains page 3—picture of a person on skis falling down page 4—MOUNTANS icon "Don't fall down the mountain!"

39. WRONG page 1—large WRONG icon page 2—picture of hand crossing out answer "OOPS, that's the wrong answer page 3—WRONG icon "Wrong answer1"

40. FROG page 1—large FROG icon page 2—animation of FROG jumping "Go, frog, go!

page 3—animation of a FROG race with two frogs jumping "Go frog, Go!

page 4—large FROG icon—other related words on the background

41. MORNING page 1—large MORNING icon page 2—picture of a kid sleeping in bed—morning icon is the background, or outside a large window, mom is in the doorway. When you touch the kid you hear snoring. When you touch the mom, you hear "It's morning, time to get up!"

page 3—large MORNING icon—"We get up in the morning."

42. NIGHT page 1—large NIGHT icon "wish"

page 2—photo or picture of a person pointing to a star in the night sky—"Star light, star bright, wish I may, wish I might, have the wish I wish tonight. (kid voice)

page 3—large NIGHT icon—"You wish upon a star at NIGHT."

43. MEDICAL page 1—large MEDICAL icon—"help"

page 2—picture of a kid on a skateboard falling—Help, he needs help page 3—Kid on the sidewalk with a broken leg another kid says—"Call the ambulance! He needs help!"

page 4—photo of an ambulance, sound of siren page 5—large MEDICAL icon—The ambulance is bringing medical help.

44. EYE page 1—large EYE icon "Look"

page 2—face with eyes like the eye icon, when you touch the eyes, you hear "Look"

page 3—kid holding up a picture "Look at my picture."

page 4—large EYE icon—"You look with your eyes."

45. QUEENBEE page 1—large QUEENBEE icon—sound of a bee buzzing—"be"

page 2—photo of a bee on a flower "Be nice"

page 3—picture of a kid talking to a bee on a flower "Be good"

page 4—large QUEENBEE icon—The QUEENBEE is a bee.

46. EAR page 1—large EAR icon—"hear"

page 2—picture of a kid telling a secret into another kid's ear. The kid's ear looks like the ear icon—sound of whispering page 3—baby face—when you touch the ears you hear "ear"

page 4—large EAR icon—"You hear with your ears."

47. REMEMBER page 1—large REMEMBER icon—"do"

page 2—large DO icon—"you do things with your hands"

page 3—large REMEMBER icon with no string page 4—string comes into the picture and goes onto the finger—"Remember to do your homework."

48. TIME page 1—large TIME icon—"take"

page 2—picture of whole body of Father Time, when you touch him, you hear an old man's voice saying "Take your time."

page 3—large TIME icon surrounded by smaller pictures of calendars, clocks, days of the week icons page 4—large TIME icon—"Father Times says 'take your time.' He has all the time words."

49. YORK page 1—large YORK icon—"building"

page 2—photo of YORK cathedral, when you touch it you hear "building" and the page changes to page 3 page 3—picture of street scene with several buildings including the York cathedral. When you touch each building, you hear the name, like house, apartment, school, library, grocery store, post office. When you touch YORK the page changes to page 4 page 4—large YORK icon "this is a building"

50. UMBRELLA page 1—large UMBRELLA icon "need" —sound of rain page 2—kid in the rain with no umbrella "I need my umbrella"

page 3—picture of another kid with an umbrella—when you touch the umbrella you hear "need" and the page changes to page 4 page 4—The two kids walk together in the rain—sound of rain and splashing water, kids laughing page 5—large UMBRELLA icon—"You need your umbrella when it rains."

51. ISLAND page 1—large ISLAND icon—"place"

page 2—photo of an island, when you touch the island you hear "place"

page 3—large ISLAND icon—"an island is a place."

52. OPEN page 1—large OPEN icon—"put"

page 2—picture of kids opening the lid on a toy chest that looks like the OPEN icon, Toys are all over the room. When you touch the toy chest you hear, "put your toys away."

page 3—large OPEN icon—"You open the toy chest to put your toys away.

53. PEOPLE page 1—large PEOPLE icon—"follow"

page 2—picture of kids lining up in a class room, when you touch the leader you hear "Follow me."

page 3—large PEOPLE icon—"People follow other people in line."

54. RAINBOW
page 1—large RAINBOW icon—"color"
page 2—photo of a rainbow—you hear outdoor sounds
page 3—picture of a rainbow with an outdoor scene—blue sky, red bird on a green tree, orange and yellow flowers, kids with bright colored clothing walking on a brown path. Each object you touch says the color name.
page 4—large RAINBOW icon—"a rainbow is made up of many colors.
55. THUMBS UP
page 1—large THUMBS UP icon—"good"
page 2—picture of a smiling kid with hand out and thumb up—when you touch him, you hear "good"
page 3—large TUMBS UP icon—"good"
56. APPLE
page 1—large APPLE icon—"eat"
page 2—picture of a kid eating an apple, you hear sounds like someone biting an apple, when you touch the apple, the page changes
page 3—large apple picture with other smaller picture of food like cookie, pretzel, banana, ice cream, grapes, around the apple picture. When you touch the apple it says eat, when you touch the other pictures you hear the picture names.
page 4—large APPLE icon—"You can eat an apple."
57. SNAIL
page 1—large SNAIL icon—"slow"
page 2—picture of kids watching a snail. "He's really slow"
page 3—icon of the snail crosses the screen very slowly
page 4—large SNAIL icon—"the snail is slow"
58. DOG
page 1—large DOG icon—"come"
page 2—picture of a kid and a dog. When you touch the kid, he says "come" Then the dog comes to the kid.
page 3—large DOG icon—"you call your dog to come."
59. FAMILY
page 1—large FAMILY icon—"family"
page 2—photo of a family—when you touch family member pictures you hear the name, mom, dad, sister, brother, etc.
page 3—large FAMILY icon—"it's all in the family."
60. GOD
page 1—large GOD icon
page 2—Happy Holidays icon in the center with other smaller holiday icons around the rest of the page—each one says the name of the holiday.
page 3—scene of mom and two kids baking cookies in the kitchen. "Let's make cookies for the holidays!" —
page 4—large GOD icon—"People make different shapes of cookies to celebrate holidays.
61. HOUSE
page 1—large HOUSE icon "home"
page 2—photos of houses, small and large from different countries and neighborhoods
page 5—large HOUSE icon "Your house is your home."
62. JUICE
page 1—large JUICE icon "drink"
page 2—picture of a hand holding the juice glass
page 3—picture of a person drinking from a juice glass—sound of drinking
page 4—large JUICE icon "you drink juice."
63. KITCHEN
page 1—large KITCHEN icon—"hot"
page 2—photo of mom in the kitchen by the stove, when you touch the stove you hear mom say "Don't touch that, it's hot!"
page 3—large KITCHEN icon—"The KITCHEN stove is hot."
64. LOVE
page 1—large LOVE icon—"love"
page 2—photo of a mom and baby—sound, baby crying
page 3—large LOVE icon—"the mother loves her baby."
65. TRUCK
page 1—large TRUCK icon—"drive"
page 2—photo of a truck—animation moves the truck across the screen—sound of truck
page 3—photo of truck driver getting out of a truck
page 4—large TRUCK icon—"Drive the truck."
66. ELEPHANTS
page 1—large ELEPHANTS icon—"big"
page 2—photo of an elephant with people or a person—sound you hear is an elephant roar
page 3—picture of an elephant with a boy standing beside it
page 4—large ELEPHANTS icon—"elephants are big."
67. THUMBSDOWN
page 1—large THUMBSDOWN icon—"bad"
page 2—picture of a kid with hand out and thumb down. The kid is frowning and looking unhappy
page 3—large THUMBSDOWN icon "Thumbs down means bad."
68. POLICE
page 1—large POLICE icon; "LET"
page 2—photo of a policeman directing traffic—traffic sound, whistle sound
page 3—large POLICE icon—The policeman let's you through."
69. SHEEP
page 1—large SHEEP icon,—"it"
page 2—photo of a sheep, sound of sheep baaa
page 3—large SHEEP icon—It is a sheep.
70. KNOT
page 1—large KNOT icon—"not"
page 2—picture of a rope
page 3—picture of a rope tied in a knot "knot"
page 4—large KNOT icon "knot means not"
71. WATCH
page 1—large WATCH icon—"start"
page 2—photo or picture of a person pointing to a watch. "It's time to start."
page 3—photo of a track race—sound of starting gun
page 4—large WATCH icon "it's time to start."
72. ZEBRA
page 1—large icon of a ZEBRA—"animal"
page 2—picture of lots of animals—when you touch one, you hear name, then the sound of the animal
page 3—large icon of a ZEBRA—"A zebra is an animal."
73. COMPUTER
page 1—large COMPUTER icon—"store"
page 2—picture of a kid working at the computer—"you store it in the computer"
page 3—large COMPUTER icon "you store it here."
74. VOLT
page 1—large VOLT icon—"fast"
page 2—photo of a lightning bolt—sound of thunder
page 3—large VOLT icon—"lightning travels fast"
75. BATH
page 1—large BATH icon—"wash"
page 2—picture of a kid in the tub—sound of water running. when you touch different body parts you hear "wash your ears, wash your face, wash your arm, wash your hair"
page 3—large BATH icon "you wash in the tub."

76. NAME
page 1—large NAME icon—"write"
page 2—picture of a hand writing a name
page 3—large NAME icon—"write your name."
77. MONEY
page 1—large MONEY icon—"have"
page 2—picture of a kid asking dad for money "can I have some money?"
page 3—picture of a kid with money
page 4—large MONEY icon "It's good to have money."
78. MASKS
page 1—large MASKS icon—"feel"
page 2—large happy mask—when you touch it you hear laughter and "I feel happy."
page 3—large sad mask—when you touch it you hear crying and "I feel sad."
page 4—large MASKS icon—"maybe you feel happy or maybe you feel sad"
79. STOP
page 1—large STOP icon "stop"
page 2—picture of a car at a stop sign—When you touch the sign you hear "stop"
page 3—picture of a road crew man holding up a stop sign—When you touch the sign you hear "stop"
page 4—picture of a kid on a bike stopped at a stop sign—When you touch the sign you hear "stop"
page 5—large STOP icon—You stop at stop signs.
80. TV
page 1—large TV icon—"ask"
page 2—scene of a family watching TV, when you touch the TV you hear "What is on TV?
page 3—large TV icon—"Ask what is on TV."
81. TURN
page 1—large TURN icon—"turn"
page 2—picture of two kids playing a board game—"My turn" "your turn" as you touch each kid
page 3—picture of a parent reading a book to a kid. When you touch the book you hear, "Turn the page."
page 4—large TURN icon—"The arrows are turning."
82. BED
page 1—large BED icon—"sleep"
page 2—picture of a person sleeping in bed, cat sleeping on the end of the bed, dog sleeping on the rug beside the bed, bird in a cage sleeping sounds of snoring
page 4—picture of a baby crying in a crib, when you touch the baby, you hear "Go to sleep."
page 5—picture of baby sleeping in the crib in the room with all of the above
page 6—large BED icon "You sleep on a BED."
83. CHAIR
page 1—large CHAIR icon "sit"
page 2—picture of a kid in a wheelchair, picture of a student in a desk chair, picture of a person in an easy chair. When you touch each one you hear, sit
page 3—picture of a dog standing up, When you touch the dog, you hear "sit"
page 4—picture of the dog sitting in a chair
page 5—large CHAIR icon—"You sit on a chair."
84. SPACE
page 1—large SPACE icon
page 2—picture of a space ship sound of a rocket launch
page 3—photo of outer space
page 4—large SPACE icon "The SPACE ship blasts off into space."
85. TRIANGE
page 1—large TRIANGLE icon
page 2—picture of a person handing a triangle to another person. When you touch the triangle you hear "Try this."
page 3—picture of a person handing a musical triangle to another person. When you touch the triangle you hear "Try this." sound of a triangle
page 4—large TRIANGLE icon "Try the triangle
86. SENTENCE
page 1—large SENTENCE icon
page 2—picture of the man and lady talking, the speech bubble above their heads looks like the sentence activity row
page 3—icons for sentence sub-categories scattered around the page. when you touch each one, you hear the name of the subcategory.
page 4—large SENTENCE icon "The people are talking in sentences."

Further Possible Applications for Minspeak® Virtual Scene Displays

The advent of Visual Scene Displays (VSD) in the field of Augmentative and Alternative Communication (AAC) has focused on vocabulary organization. As such, vocabulary is embedded in hot spots on the VSD, and retrieved accessing the hot spot segment of the scene representative of the targeted word. In such models, the VSD typically depicts an environmental scene—a photographic or line drawing of, say, a room in a house—with discrete elements representing specific messages (e.g., touching the dresser branches to additional words or sentences related to getting dressed). The rationale for such an organization has been to provide a concrete organizational structure to vocabulary as opposed to fixing vocabulary involving single meaning pictures on grids. Unfortunately, representations of environmental scenes of tended to limit vocabulary to nouns of items depicted in the Visual Scenes, or to phrases associated with the theme of a particular visual scene (e.g., in the bedroom, touching the lamp might yield the phrase "Leave the light on.")

The combined use of Minspeak/Unity and Visual Scene Displays, in at least one embodiment of the present application, would differ significantly in that the vocabulary set would remain, primarily distinct from the Visual Scene Display.

Minspeak Core Vocabulary and Visual Scene Displays

Minspeak employs "polysemic"/"polysemous", or multi-meaning icons or symbols on a fixed grid system. The combination of icons on the fixed display (when actuated in sequence) accesses a spoken word and its text label may appear in a message window. It is now possible to divide the screen of an AAC device 8 into two sections—a VSD on one part (the upper half, for example) and a grid of Minspeak core vocabulary icons on another part (the lower half, for example, noting that any aspect of presenting both displays either consecutively or concurrently is within the embodiments of the present application, including in any ratio, and not just a 50-50 split). Presenting a VSD simultaneously and in conjunction with Minspeak core vocabulary allows for the following scenarios for supporting language learning and augmenting communication:

In at least one embodiment, the MVSD display (the Minspeak VSD) may act as a prompt for learning new Minspeak icon sequences. After attending to the MVSD presentation, the user may then constructs messages using Minspeak core vocabulary grids. Non-limiting examples are as follows.

In an embodiment, static VSD may employ individual elements of an icon sequence in a cohesive scene. The scene may provide additional visual information for the User to comprehend the relationship of the disparate iconic elements and the overall meaning of the sequence. For example, the Minspeak icon sequence for "Afternoon" encoded by the icons    may be prompted by displaying on the MSVD as a single scene image of Father Time walking in the desert with the sun shining on him.

In an embodiment, animated VSDs may suggest icon sequences for verbs, adjectives, adverbs, and descriptive vocabulary as described above. Such parts of speech may be better represented through moving images emphasizing their relative definitions. For example, "paint" is encoded by the icons    These may be animated to show the Action Man painting the house in a rainbow of colors.

In an embodiment, animated VSDs may morph icon sequence elements from cohesive visual scenes into or onto the location of icons on the Minspeak core icon grid. The same icons presented on the VSD may travel across the display onto the Minspeak core icon grid in the location and sequence required for the Minspeak icon sequence. For example, in the above example for afternoon, the static scene icon elements    may migrate from the MVSD above to their respective locations on the Minspeak core vocabulary grid below.

In an embodiment, static VSDs set up in a tutorial learning pattern may progress from most- to least-intrusive prompts to assist the user in learning words, phrases, and sentences. Most intrusive prompts could include representations of icon sequences for the user to copy on the Minspeak core vocabulary grid. Least intrusive prompts might require the user to translate a spoken or visual message into icon sequences. Such a structured tutorial would allow the user to self-study Minspeak lessons.

In an embodiment, animated VSDs may provide on-line tutorial videos for learning Minspeak or other aspects of the device operation. Allowing for a visual manual, the VSD may then inform the user (or support personnel) of issues related to AAC, Minspeak, device use, etc.

In at least one embodiment, the MVSD may reflect the user's exploratory construction of Minspeak icon sequences. After the user activates icons on the Minspeak core vocabulary display, the MVSD may present additional visual information to reinforce or augment vocabulary concepts. Examples are as follows.

In an embodiment, the MVSD may reinforce Minspeak symbol sequence learning by presenting both text and Minspeak icon sequences created by the user. The MVSD may operate as an expanded Message Window, but with a graphic record of the user's iconic writing. Such a record might look like the following on the MVSD: .

The MVSD may display a static scene depicting concepts represented by Minspeak icons. For example, once "paint" is constructed through the icon sequence , the MVSD might display the graphic image  The MVSD may display an animated scene depicting concepts represented by Minspeak icons.

In an embodiment, the MVSD may display dynamic scenes depicting concepts represented by Minspeak icons. Dynamic scenes may, with hot spots, branch to additional related vocabulary concepts or fringe vocabulary.

In an embodiment, the MVSD may provide additional visual information linked to specific icon sequences or vocabulary. Upon activation of certain key words or icons through Minspeak core vocabulary, the MVSD may provide additional visual information. The visual information may provide additional context for the benefit of the communication partner to see. For example, the Minspeak sequences for "my sister" results in a digital photo of the user's sister displayed on the MVSD. Upon activation of certain key words or icons through Minspeak core vocabulary, the MVSD may retrieve visual information for benefit of User. The User may use the visual information as a cognitive prosthetic, self-organizational tool, personal digital assistant, etc.

In an embodiment, another possibility is to merge the images of a Minspeak core vocabulary grid with a VSD, essentially superimposing one upon the other. Such an arrangement would offer the following possibilities for language learning and augmented communication:

1. The MVSD may incorporate the relative locations of Minspeak core vocabulary icons into a superimposed visual scene display. For example the word "afternoon" may be prompted by a VSD incorporating the icons ,  and  in an image preserving their relative locations on the Minspeak core vocabulary grid. The display may be used to prompt the learning new icon sequences, or may appear in response to exploratory selections of icons.
2. The MVSD may superimpose an image relative to the conversational topic. The superimposed Minspeak core vocabulary grid would allow the user access to vocabulary with which to converse about the MVSD image.

Further, elements and/or features of different example embodiments may be combined with each other and/or substituted for each other within the scope of this disclosure and appended claims. In addition, various ones of the embodiments of the methods expressed above can include monitoring usage of polysemous symbols and the displayed scene; and/or using context of the displayed scene to teach de-contextualized sequencing of the polysemous symbols of the keyboard. Further, various ones of the embodiments of the methods expressed above can include using the displayed scene to teach someone at least a portion of the symbol sequence, usable to access at least one of a word, phrase, and message and/or animating, in the displayed scene, at least one aspect of at least one of the symbol sequence and the at least one of the accessible word, phrase, and message. Further, the using of the displayed scene to teach may include animating, in the displayed scene, at least one aspect of at least one of the symbol sequence and the at least one of the accessible word, phrase, and message.

Further, various ones of the embodiments of the devices expressed above can include a keyboard which is a virtual keyboard, a wired keyboard or a combination thereof. Further, in various ones of the embodiments of the devices expressed above, the keyboard and display may be integrated in a touch panel display.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the embodiments of the aforementioned methods, when run on a computer device (such as a device 8 including a processor 4 for example). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
   displaying a keyboard including a plurality of selectable keys;
   receiving an indication of selection of a key from the keyboard, including at least one of a polysemous symbol and a compilation symbol; and
   displaying one of a plurality of scenes, the scene being displayed subsequent to the received indication of selection and in place of at least some of the plurality of selectable keys on the keyboard, the scene being related to the selected at least one of a polysemous symbol and a compilation symbol, and the scene including both selectable and non-selectable information.

2. The method of claim 1, wherein the displaying includes displaying the scene, the scene including the selected at least one of a polysemous symbol and a compilation symbol.

3. The method of claim 2, wherein the compilation symbol is a compilation of a selectable symbol sequence.

4. The method of claim 1, further comprising providing an audible output relating the selected at least one of a polysemous symbol and a compilation symbol to at least one of a word, phrase, and message, accessible via a selectable symbol sequence.

5. The method of claim 1, wherein the displayed scene relates the selected polysemous symbol to at least one of a word, phrase, and message, accessible via a selectable symbol sequence including the selected polysemous symbol.

6. The method of claim 1, wherein the displayed scene relates the selected polysemous symbol to a related group of at least one of words, phrases, and messages, each accessible via a selectable symbol sequence including the selected polysemous symbol.

7. The method of claim 1, wherein the scene is displayed on the display in place of at least a portion of the keyboard.

8. A method, comprising:
   displaying a keyboard including a plurality of selectable keys;
   receiving an indication of selection of a key from the keyboard, including a polysemous symbol; and
   displaying one of a plurality of scenes, the scene being displayed subsequent to the received indication of selection and in place of at least some of the plurality of selectable keys on the keyboard, the scene relating at least one of an accessible word, phrase or message to the polysemous symbol of the selected key, and the scene including both selectable and non-selectable information.

9. The method of claim 8, wherein the selected polysemous symbol is a first symbol for a group of selectable symbol sequences.

10. The method of claim 9, wherein the group of selectable symbol sequences are of a common part of speech.

11. The method of claim 8, further comprising providing an audible output relating the selected polysemous symbol to at least one of a word, phrase, and message, accessible via the selected polysemous symbol.

12. A method, comprising:
    displaying a keyboard including a plurality of selectable keys;
    receiving an indication of selection of a key from the keyboard, including a polysemous symbol; and
    displaying one of a plurality of scenes on at least a portion of a display, the scene being displayed subsequent to the received indication of selection and in place of at least some of the plurality of selectable keys on the keyboard, the scene relating the polysemous symbol of the selected key to a category of selectable symbol sequences including the polysemous symbol of the selected key as a first symbol, and the scene including both selectable and non-selectable information.

13. The method of claim 12, wherein the category of selectable symbol sequences are usable to access at least one of a word, phrase, and message of common parts of speech.

14. The method of claim 12, further comprising providing an audible output relating the selected polysemous symbol to a category of selectable symbol sequences including the selected polysemous symbol as a first symbol.

15. A device, comprising:
    a virtual keyboard including a plurality of keys including at least one of at least one polysemous symbol and at least one compilation symbol; and
    a display to display the virtual keyboard and to display one of a plurality of scenes on at least a portion of the display in place of at least some of the plurality of selectable keys on the virtual keyboard, the displayed scene being displayable subsequent to selection of a key including at least one of a polysemous symbol and a compilation symbol and being related to the selected at least one of a polysemous symbol and a compilation symbol, and the scene including both selectable and non-selectable information.

16. The device of claim 15, further comprising:
    an audible output device to provide an audible output relating the selected at least one of a polysemous symbol and a compilation symbol to at least one of a word, phrase, and message, accessible via a selectable symbol sequence.

17. A device, comprising:
    a virtual keyboard including a plurality of keys including polysemous symbols; and
    a display to display the virtual keyboard and to display one of a plurality of scenes on at least a portion of the display in place of at least some of the plurality of selectable keys on the virtual keyboard, the scene being displayable subsequent to selection of a key including a polysemous symbol and relating the selected polysemous symbol to at least one of a word, phrase, and message, accessible via a selectable symbol sequence including the selected polysemous symbol, and the scene including both selectable and non-selectable information.

18. The device of claim 17, further comprising:
an audible output device to provide an audible output relating the selected polysemous symbol to at least one of a word, phrase, and message, accessible via a selectable symbol sequence including the selected polysemous symbol.

19. A method, comprising:
displaying a keyboard including a plurality of selectable keys;
receiving an indication of selection of a key from the keyboard, including a compilation symbol relating to plurality of symbols in a sequence of symbols usable to access at least one of a word, phrase and message; and
displaying one of a plurality of scenes including the compilation symbol, the scene being displayed subsequent to the received indication of selection and in place of at least some of the plurality of selectable keys on the keyboard, the scene relating the selected compilation symbol to the accessible at least one of a word, phrase, and message, and the scene including both selectable and non-selectable information.

20. The method of claim 19, further comprising providing an audible output relating the selected compilation symbol to the accessible at least one of a word, phrase, and message.

21. A method, comprising:
displaying a keyboard including a plurality of selectable keys;
receiving an indication of selection of a key from the keyboard, including a compilation of a plurality of symbols which, when sequenced together, are usable to access at least one of a word, phrase and message; and
displaying one of a plurality of scenes including the selected key, the scene being displayed subsequent to the received indication of selection and in place of at least some of the plurality of selectable keys on the keyboard, the scene relating the selected compilation of a plurality of symbols to the accessible at least one of a word, phrase, and message, and the scene including both selectable and non-selectable information.

22. The method of claim 21, further comprising providing an audible output relating the selected plurality of symbols to the accessible at least one of a word, phrase, and message.

23. A device, comprising:
a virtual keyboard including a plurality of keys, at least one key including a compilation symbol relating to plurality of symbols in a sequence of symbols usable to access at least one of a word, phrase and message; and
a display to display the virtual keyboard and to display one of a plurality of scenes on at least a portion of the display in place of at least some of the plurality of selectable keys on the virtual keyboard, the scene being displayable subsequent to selection of a key including a compilation symbol and relating the selected compilation symbol to the accessible at least one of a word, phrase, and message, and the scene including both selectable and non-selectable information.

24. The device of claim 23, further comprising:
an audible output device to provide an audible output relating the selected compilation symbol to the accessible at least one of a word, phrase, and message.

25. A device, comprising:
a virtual keyboard including a plurality of keys, at least one key including a compilation of a plurality of symbols which, when sequenced together, are usable to access at least one of a word, phrase and message; and
a display to display the virtual keyboard and to display one of a plurality of scenes on at least a portion of the display in place of at least some of the plurality of selectable keys on the virtual keyboard, the scene being displayable subsequent to selection of a key including a compilation of a plurality of symbols and relating the selected key including the compilation of a plurality of symbols to the accessible at least one of a word, phrase, and message, and the scene including both selectable and non-selectable information.

26. The device of claim 25, further comprising:
an audible output device to provide an audible output relating the selected key including the plurality of symbols to the accessible at least one of a word, phrase, and message.

27. The method of claim 1, further comprising:
monitoring usage of polysemous symbols and the displayed scene.

28. The method of claim 12, further comprising:
monitoring usage of polysemous symbols and the displayed scene.

29. The method of claim 19, further comprising:
monitoring usage of polysemous symbols and the displayed scene.

30. The method of claim 21, further comprising:
monitoring usage of polysemous symbols and the displayed scene.

31. The method of claim 8, further comprising:
monitoring usage of compilation symbols and polysemous symbols.

32. The method of claim 1, wherein a hard-wired keyboard is additionally included.

33. The method of claim 8, wherein a hard-wired keyboard is additionally included.

34. The method of claim 12, wherein a hard-wired keyboard is additionally included.

35. The method of claim 19, wherein a hard-wired keyboard is additionally included.

36. The method of claim 21, wherein a hard-wired keyboard is additionally included.

37. The device of claim 15, wherein the virtual keyboard and display are integrated as a touch panel display.

38. The device of claim 15, wherein the device includes the virtual keyboard displayable on the display and a hard-wired keyboard, separate from the display.

39. The device of claim 17, wherein the virtual keyboard and display are integrated as a touch panel display.

40. The device of claim 17, wherein the device includes the virtual keyboard displayable on the display and a hard-wired keyboard, separate from the display.

41. The device of claim 23, wherein the virtual keyboard and display are integrated as a touch panel display.

42. The device of claim 23, wherein the device includes the virtual keyboard displayable on the display and a hard-wired keyboard, separate from the display.

43. The device of claim 25, wherein the virtual keyboard and display are integrated as a touch panel display.

44. The device of claim 25, wherein the device includes the virtual keyboard displayable on the display and a hard-wired keyboard, separate from the display.

45. A method, comprising:
displaying a plurality of selectable polysemous symbols;
displaying one of a plurality of scenes relating a selected polysemous symbol to at least one of a word, phrase, and message, accessible via a selectable symbol sequence including the selected polysemous symbol, the scene being displayed subsequent to selection of the polysemous symbol and in place of at least some of the plurality of selectable polysemous symbols, and the scene including both selectable and non-selectable information; and monitoring usage of polysemous symbols and the displayed scene.

46. A method, comprising:

displaying a plurality of selectable compilation and polysemous symbols;

displaying one of a plurality of scenes including a compilation symbol related to plurality of symbols in a sequence of symbols usable to access at least one of a word, phrase and message, the displayed scene relating a selected compilation symbol to the accessible at least one of a word, phrase, and message, the scene being displayed subsequent to selection of the compilation symbol and in place of at least some of the plurality of selectable compilation and/or polysemous symbols, and the scene including both selectable and non-selectable information; and monitoring usage of at least two of compilation symbols, polysemous symbols and displayed scenes.

47. A device, comprising:

a display to display a plurality of selectable polysemous symbols and to display one of a plurality of scenes relating a selected polysemous symbol to at least one of a word, phrase, and message, accessible via a selectable symbol sequence including the selected polysemous symbol, the scene being displayable subsequent to selection of the polysemous symbol and in place of at least some of the plurality of selectable polysemous symbols, and the scene including both selectable and non-selectable information; and a processor to monitor usage of polysemous symbols and the displayed scene.

48. A device, comprising:

a display to display a plurality of selectable compilation and polysemous symbols and to display one of a plurality of scenes including a compilation symbol related to plurality of symbols in a sequence of symbols usable to access at least one of a word, phrase and message, the displayed scene relating a selected compilation symbol to the accessible at least one of a word, phrase, and message, the scene being displayable subsequent to selection of the compilation symbol and in place of at least some of the plurality of selectable compilation and/or polysemous symbols, and the scene including both selectable and non-selectable information; and a processor to monitor usage of at least two of compilation symbols, polysemous symbols and displayed scenes.

49. The device of claim 47, further comprising at least one of a virtual keyboard and a hard-wired keyboard.

50. The device of claim 48, further comprising at least one of a virtual keyboard and a hard-wired keyboard.

51. A non-transitory computer readable medium including program segments for, when executed on a computer device, causing the computer device to:

display a keyboard including a plurality of selectable keys;

receive an indication of selection of a key from the keyboard, including at least one of a polysemous symbol and a compilation symbol; and display one of a plurality of scenes subsequent to the receipt of the indication of selection and in place of at least some of the plurality of selectable keys on the keyboard, the scene being related to the selected at least one of a polysemous symbol and a compilation symbol and including both selectable and non-selectable information.

52. A non-transitory computer readable medium including program segments for, when executed on a computer device, causing the computer device to display a keyboard, including a plurality of selectable keys, on a display;

receive an indication of selection of a key from the keyboard, including a polysemous symbol; and display one of a plurality of scenes on at least a portion of the display, the scene being displayable subsequent to the receipt of the indication of selection and in place of at least some of the plurality of selectable keys on the keyboard, the scene relating the polysemous symbol of the selected key to a category of selectable symbol sequences including the polysemous symbol of the selected key as a first symbol, and the scene including both selectable and non-selectable information.

53. A non-transitory computer readable medium including program segments for, when executed on a computer device, causing the computer device to display a keyboard including a plurality of selectable keys;

receive an indication of selection of a key from the keyboard, including a compilation symbol relating to plurality of symbols in a sequence of symbols usable to access at least one of a word, phrase and message; and display one of a plurality of scenes, including the compilation symbol, the scene being displayable subsequent to the receipt of the indication of selection and in place of at least some of the plurality of selectable keys on the keyboard, the scene relating the selected compilation symbol to the accessible at least one of a word, phrase, and message, and the scene including both selectable and non-selectable information.

54. A non-transitory computer readable medium including program segments for, when executed on a computer device, causing the computer device to display a keyboard including a plurality of selectable keys;

receive an indication of selection of a key from the keyboard, including a compilation of a plurality of symbols which, when sequenced together, are usable to access at least one of a word, phrase and message; and display one of a plurality of scenes, including the selected key, the scene being displayable subsequent to the receipt of the indication of selection and in place of at least some of the plurality of selectable keys on the keyboard, the scene relating the selected compilation of a plurality of symbols to the accessible at least one of a word, phrase, and message, and the scene including both selectable and non-selectable information.

55. A non-transitory computer readable medium including program segments for, when executed on a computer device, causing the computer device to display a keyboard including a plurality of selectable keys;

receive an indication of selection of a key from the keyboard, including a polysemous symbol; and display one of a plurality of scenes relating at least one of an accessible word, phrase or message to the polysemous symbol of the selected key, the scene being displayable subsequent to the receipt of the indication of selection and in place of at least some of the plurality of selectable keys on the keyboard, the scene including both selectable and non-selectable information.

56. A non-transitory computer readable medium including program segments for, when executed on a computer device, causing the computer device to display a plurality of selectable polysemous symbols;

display one of a plurality of scenes relating a selected polysemous symbol to at least one of a word, phrase, and message, accessible via a selectable symbol sequence including the selected polysemous symbol, the scene being displayable subsequent to selection of the polysemous symbol and in place of at least some of the plurality of selectable polysemous symbols, the scene including both selectable and non-selectable information; and monitor usage of polysemous symbols and the displayed scene.

57. A computer readable medium including program segments for, when executed on a computer device, causing the computer device to display a plurality of selectable polysemous and compilation symbols;

display one of a plurality of scenes, including at least one compilation symbol related to plurality of symbols in a sequence of symbols usable to access at least one of a word, phrase and message, the scene relating a selected one of the at least one compilation symbol to the accessible at least one of a word, phrase, and message, the scene being displayable subsequent to selection of the at least one compilation symbol and in place of at least some of the plurality of selectable polysemous and/or compilation symbols, the scene including both selectable and non-selectable information; and monitor usage of at least two of compilation symbols, polysemous symbols and displayed scenes.

58. The method of claim 1, wherein context of the displayed scene conveys information which is useable to teach de-contextualized sequencing of the polysemous symbols of the keyboard.

59. The method of claim 8, wherein context of the displayed scene conveys information which is useable to teach de-contextualized sequencing of the polysemous symbols of the keyboard.

60. The method of claim 12, wherein context of the displayed scene conveys information which is useable to teach de-contextualized sequencing of the polysemous symbols of the keyboard.

61. The method of claim 19, wherein context of the displayed scene conveys information which is useable to teach de-contextualized sequencing of the symbols of the keyboard related to the compilation symbol.

62. The method of claim 21, wherein context of the displayed scene conveys information which is useable to teach de-contextualized sequencing of the symbols of the keyboard.

63. The method of claim 1, wherein the displayed scene conveys information which is useable to teach someone at least a portion of a symbol sequence at least one of including the selected polysemous symbol and related to the selected compilation symbol.

64. The method of claim 8, wherein the displayed scene conveys information which is useable to teach someone at least a portion of the symbol sequence, usable to access at least one of a word, phrase, and message.

65. The method of claim 12, wherein the displayed scene conveys information which is useable to teach someone at least a portion of the symbol sequence, usable to access at least one of a word, phrase, and message.

66. The method of claim 19, wherein the displayed scene conveys information which is useable to teach someone at least a portion of the symbol sequence, usable to access at least one of a word, phrase, and message.

67. The method of claim 21, wherein the displayed scene conveys information which is useable to teach someone at least a portion of the symbol sequence, usable to access at least one of a word, phrase, and message.

68. The method of claim 1, further comprising:

animating, in the displayed scene, at least one aspect of at least one of the selected polysemous or compilation symbol.

69. The method of claim 8, further comprising:

animating, in the displayed scene, at least one aspect of at least one of the symbol sequence and the at least one of the accessible word, phrase, and message.

70. The method of claim 12, further comprising:

animating, in the displayed scene, at least one aspect of at least one of the symbol sequence and the at least one of the accessible word, phrase, and message.

71. The method of claim 19, further comprising:

animating, in the displayed scene, at least one aspect of at least one of the symbol sequence and the at least one of the accessible word, phrase, and message.

72. The method of claim 21, further comprising:

animating, in the displayed scene, at least one aspect of at least one of the symbol sequence and the at least one of the accessible word, phrase, and message.

73. The method of claim 63, wherein the using the displayed scene to teach includes animating, in the displayed scene, at least one aspect of at least one of the symbol sequence and the at least one of the accessible word, phrase, and message.

74. The method of claim 64, wherein the using the displayed scene to teach includes animating, in the displayed scene, at least one aspect of at least one of the selected polysemous or compilation symbol.

75. The method of claim 65, wherein the using the displayed scene to teach includes animating, in the displayed scene, at least one aspect of at least one of the symbol sequence and the at least one of the accessible word, phrase, and message.

76. The method of claim 66, wherein the using the displayed scene to teach includes animating, in the displayed scene, at least one aspect of at least one of the symbol sequence and the at least one of the accessible word, phrase, and message.

77. The method of claim 67, wherein the using the displayed scene to teach includes animating, in the displayed scene, at least one aspect of at least one of the symbol sequence and the at least one of the accessible word, phrase, and message.

78. The method of claim 1, wherein an indication of selection of a plurality of keys from the keyboard is received, each including a polysemous symbol, the displaying of the scene occurring subsequent to receipt of an indication of selection of a second key including a polysemous symbol.

79. The method of claim 78, further comprising:

displaying previously undisplayed symbols on a plurality of keys, the previously undisplayed symbols corresponding to symbols useable to access a stored word, phrase or message when sequenced with the symbols of the selected keys.

80. The device of claim 15, wherein the display is useable to display the scene in response to selection of a plurality of keys from the keyboard, each including a polysemous symbol.

81. The device of claim 80, wherein, in response to selection of a plurality of keys from the keyboard, the display is useable to display previously undisplayed symbols on a plurality of keys, the previously undisplayed symbols corresponding to symbols useable to access a stored word, phrase or message when sequenced with the symbols of the selected keys.

82. The method of claim 1, wherein the scene visually conveys an environment for the selectable and non-selectable information.

83. The method of claim 8, wherein the scene visually conveys an environment for the selectable and non-selectable information.

84. The method of claim 12, wherein the scene visually conveys an environment for the selectable and non-selectable information.

85. The device of claim 15, wherein the scene visually conveys an environment for the selectable and non-selectable information.

86. The device of claim 17, wherein the scene visually conveys an environment for the selectable and non-selectable information.

87. The method of claim 19, wherein the scene visually conveys an environment for the selectable and non-selectable information.

88. The method of claim 21, wherein the scene visually conveys an environment for the selectable and non-selectable information.

89. The device of claim 23, wherein the scene visually conveys an environment for the selectable and non-selectable information.

90. The device of claim 25, wherein the scene visually conveys an environment for the selectable and non-selectable information.

91. The method of claim 45, wherein the scene visually conveys an environment for the selectable and non-selectable information.

92. The method of claim 46, wherein the scene visually conveys an environment for the selectable and non-selectable information.

93. The device of claim 47, wherein the scene visually conveys an environment for the selectable and non-selectable information.

94. The device of claim 48, wherein the scene visually conveys an environment for the selectable and non-selectable information.

95. The computer readable medium of claim 51, wherein the scene visually conveys an environment for the selectable and non-selectable information.

96. The computer readable medium of claim 52, wherein the scene visually conveys an environment for the selectable and non-selectable information.

97. The computer readable medium of claim 53, wherein the scene visually conveys an environment for the selectable and non-selectable information.

98. The computer readable medium of claim 54, wherein the scene visually conveys an environment for the selectable and non-selectable information.

99. The computer readable medium of claim 55, wherein the scene visually conveys an environment for the selectable and non-selectable information.

100. The computer readable medium of claim 56, wherein the scene visually conveys an environment for the selectable and non-selectable information.

101. The computer readable medium of claim 57, wherein the scene visually conveys an environment for the selectable and non-selectable information.

* * * * *